(12) United States Patent  
Cox et al.

(10) Patent No.: US 11,458,427 B2  
(45) Date of Patent: *Oct. 4, 2022

(54) FINE FIBER FILTER MEDIA AND PROCESSES

(71) Applicant: Hollingsworth & Vose Company, East Walpole, MA (US)

(72) Inventors: Stephen T. Cox, Nashua, NH (US); William S. Freeman, Roanoke, VA (US); Abdoulaye Doucouré, Roanoke, VA (US); John A. Wertz, Hollis, NH (US)

(73) Assignee: Hollingsworth & Vose Company, East Walpole, MA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/095,292

(22) Filed: Nov. 11, 2020

(65) Prior Publication Data

US 2021/0129061 A1 May 6, 2021

Related U.S. Application Data

(63) Continuation of application No. 16/170,350, filed on Oct. 25, 2018, now Pat. No. 10,874,962, which is a (Continued)

(51) Int. Cl.  
*B01D 39/16* (2006.01)  
*B32B 5/02* (2006.01)  
(Continued)

(52) U.S. Cl.  
CPC .......... *B01D 39/1623* (2013.01); *B32B 5/022* (2013.01); *B32B 5/26* (2013.01);  
(Continued)

(58) Field of Classification Search  
CPC ........ B01D 39/1623; B01D 2239/1216; B01D 2239/1233; B01D 2239/1258;  
(Continued)

(56) References Cited

U.S. PATENT DOCUMENTS 3,353,682 A 11/1967 Pall et al.  
3,849,241 A 11/1974 Butin et al.  
(Continued)

FOREIGN PATENT DOCUMENTS

CN 1275923 A 12/2000  
DE 10 2005 055 607 B3 3/2007  
(Continued)

OTHER PUBLICATIONS

Extended European Search Report for EP 11864804.7 dated Oct. 7, 2015.  
(Continued)

*Primary Examiner* — Joseph W Drodge  
(74) *Attorney, Agent, or Firm* — Wolf, Greenfield & Sacks, P.C.

(57) ABSTRACT

Fine fiber products including fiber webs, as well as related assemblies, systems and methods, are described. In some embodiments, fiber webs described herein may include fine fibers and relatively low amounts of degraded polymer formed during a fiber extrusion process. The fiber webs may be used for filter media applications.

19 Claims, 1 Drawing Sheet

Related U.S. Application Data continuation of application No. 13/528,796, filed on Jun. 20, 2012, now Pat. No. 10,155,186, which is a continuation-in-part of application No. 12/971,594, filed on Dec. 17, 2010, now abandoned, which is a continuation-in-part of application No. 12/971,539, filed on Dec. 17, 2010, now abandoned.

(51) Int. Cl.
 *B32B 5/26* (2006.01)
 *D04H 3/16* (2006.01)

(52) U.S. Cl.
 CPC ....... *D04H 3/16* (2013.01); *B01D 2239/1216* (2013.01); *B01D 2239/1233* (2013.01); *B01D 2239/1258* (2013.01); *B01D 2239/1266* (2013.01)

(58) Field of Classification Search
 CPC ........ B01D 2239/1266; B01D 29/0047; B01D 29/0052; B01D 29/0093; B01D 29/01; B01D 39/06; B01D 39/16; B01D 39/1607; B01D 39/1684; B01D 39/2003; B01D 39/2014; B01D 39/2017; B01D 2201/188; B01D 2239/0613; B01D 2239/0622; B01D 2239/0627; B01D 2239/0631; B01D 2239/0636; B01D 2239/065; B01D 2239/0654; B01D 2239/0668; B01D 2239/069; B01D 2239/1225; B01D 2275/10; B01D 2275/105; B01D 2275/30; B32B 5/022; B32B 5/26; B32B 5/22; B32B 5/32; B32B 17/00; B32B 17/02; B32B 17/06; B32B 17/064; B32B 17/10; B32B 27/12; D04H 3/16; G06K 9/00335; Y10T 428/249964; Y10T 428/249969
 See application file for complete search history.

(56) References Cited

U.S. PATENT DOCUMENTS

| | | |
|---|---|---|
| 4,102,785 A | 7/1978 | Head et al. |
| 4,622,259 A | 11/1986 | McAmish et al. |
| 4,824,451 A | 4/1989 | Vogt et al. |
| 4,925,601 A | 5/1990 | Vogt et al. |
| 5,108,474 A | 4/1992 | Reidy et al. |
| 5,108,827 A | 4/1992 | Gessner |
| 5,149,576 A | 9/1992 | Potts et al. |
| 5,178,931 A | 1/1993 | Perkins et al. |
| 5,238,474 A | 8/1993 | Kahlbaugh et al. |
| 5,240,479 A | 8/1993 | Bachinski |
| 5,306,321 A | 4/1994 | Osendorf |
| 5,401,446 A | 3/1995 | Tsai et al. |
| 5,496,507 A | 3/1996 | Angadjivand et al. |
| 5,580,459 A | 12/1996 | Powers et al. |
| 5,582,907 A | 12/1996 | Pall |
| 5,620,785 A | 4/1997 | Watt et al. |
| 5,647,881 A | 7/1997 | Zhang et al. |
| 5,665,803 A | 9/1997 | Nohr et al. |
| 5,672,188 A | 9/1997 | Choi |
| 5,672,399 A | 9/1997 | Kahlbaugh et al. |
| 5,702,616 A | 12/1997 | Degen et al. |
| 5,783,503 A | 7/1998 | Gillespie et al. |
| 5,785,725 A | 7/1998 | Cusick et al. |
| 5,786,065 A | 7/1998 | Annis et al. |
| 5,804,512 A | 9/1998 | Lickfield et al. |
| 5,935,883 A | 8/1999 | Pike |
| 5,955,174 A | 9/1999 | Wadsworth et al. |
| 5,993,501 A | 11/1999 | Cusick et al. |
| 6,034,008 A | 3/2000 | Lim et al. |
| 6,113,784 A | 9/2000 | Stoyell et al. |
| 6,120,939 A | 9/2000 | Whear et al. |
| 6,123,752 A | 9/2000 | Wu et al. |
| 6,171,369 B1 | 1/2001 | Schultink et al. |
| 6,171,684 B1 | 1/2001 | Kahlbaugh et al. |
| 6,193,773 B1 | 2/2001 | Schlor et al. |
| 6,261,979 B1 | 7/2001 | Tanaka et al. |
| 6,267,252 B1 | 7/2001 | Amsler |
| 6,315,806 B1 | 11/2001 | Torobin et al. |
| 6,372,004 B1 | 4/2002 | Schultink et al. |
| 6,422,396 B1 | 7/2002 | Li et al. |
| 6,428,610 B1 | 8/2002 | Tsai et al. |
| 6,476,135 B1 | 11/2002 | Bugada et al. |
| 6,517,612 B1 | 2/2003 | Crouch et al. |
| 6,554,881 B1 | 4/2003 | Healey |
| 6,579,350 B2 | 6/2003 | Doherty |
| 6,603,054 B2 | 8/2003 | Chen et al. |
| 6,743,273 B2 | 6/2004 | Chung et al. |
| 6,746,517 B2 | 6/2004 | Benson et al. |
| 6,759,356 B1 | 7/2004 | Myers |
| 6,858,057 B2 | 2/2005 | Healey |
| 6,872,311 B2 | 3/2005 | Koslow |
| 6,924,028 B2 | 8/2005 | Chung et al. |
| 6,936,554 B1 | 8/2005 | Singer et al. |
| 6,955,775 B2 | 10/2005 | Chung et al. |
| 6,986,804 B2 | 1/2006 | Dominiak et al. |
| 7,008,465 B2 | 3/2006 | Graham et al. |
| 7,070,640 B2 | 7/2006 | Chung et al. |
| 7,137,510 B1 | 11/2006 | Klein et al. |
| 7,144,533 B2 | 12/2006 | Koslow |
| 7,179,317 B2 | 2/2007 | Chung et al. |
| 7,235,122 B2 | 6/2007 | Bryner et al. |
| 7,309,372 B2 | 12/2007 | Kahlbaugh et al. |
| 7,314,497 B2 | 1/2008 | Kahlbaugh et al. |
| 7,316,723 B2 | 1/2008 | Chung et al. |
| 7,318,852 B2 | 1/2008 | Chung et al. |
| 7,319,122 B2 | 1/2008 | Cheng et al. |
| 7,390,760 B1 | 6/2008 | Chen et al. |
| 7,491,770 B2 | 2/2009 | Autran et al. |
| 7,597,773 B2 | 10/2009 | Kume et al. |
| 7,645,312 B2 | 1/2010 | Hamlin et al. |
| 7,781,527 B2 | 8/2010 | Autran et al. |
| 7,918,913 B2 | 4/2011 | Kalayci et al. |
| 7,960,478 B2 | 6/2011 | Autran et al. |
| 7,985,802 B2 | 7/2011 | Chien et al. |
| 7,993,427 B2 | 8/2011 | Hassmann et al. |
| 8,142,535 B2 | 3/2012 | Grove |
| 8,545,587 B2 | 10/2013 | Guimond et al. |
| 8,608,817 B2 | 12/2013 | Wertz et al. |
| 8,679,218 B2 | 3/2014 | Guimond et al. |
| 8,950,587 B2 | 2/2015 | Thomson et al. |
| 8,986,432 B2 | 3/2015 | Wertz et al. |
| 9,283,501 B2 | 3/2016 | Wertz et al. |
| 9,694,306 B2 | 7/2017 | Anantharamaiah et al. |
| 9,950,284 B2 | 4/2018 | Thomson et al. |
| 10,155,186 B2 | 12/2018 | Cox et al. |
| 10,155,187 B2 | 12/2018 | Wertz et al. |
| 10,653,986 B2 | 5/2020 | Cox et al. |
| 10,682,595 B2 | 6/2020 | Thomson et al. |
| 10,874,962 B2 | 12/2020 | Cox et al. |
| 2001/0035094 A1 | 11/2001 | Takagaki et al. |
| 2001/0045086 A1 | 11/2001 | Cox et al. |
| 2002/0013112 A1 | 1/2002 | Bontaites et al. |
| 2002/0056684 A1 | 5/2002 | Klein |
| 2002/0083837 A1 | 7/2002 | Doherty |
| 2002/0193553 A1 | 12/2002 | Qin et al. |
| 2003/0003834 A1 | 1/2003 | Berrigan et al. |
| 2003/0010210 A1 | 1/2003 | Kawano et al. |
| 2003/0057613 A1 | 3/2003 | Bansal et al. |
| 2003/0106294 A1 | 6/2003 | Chung et al. |
| 2003/0150199 A1 | 8/2003 | Tanaka et al. |
| 2003/0168401 A1 | 9/2003 | Koslow |
| 2003/0177909 A1 | 9/2003 | Koslow |
| 2003/0196963 A1 | 10/2003 | Koslow |
| 2003/0196964 A1 | 10/2003 | Koslow |
| 2003/0201231 A1 | 10/2003 | Koslow |
| 2003/0203696 A1 | 10/2003 | Healey |
| 2003/0205529 A1 | 11/2003 | Koslow |
| 2003/0205530 A1 | 11/2003 | Koslow |
| 2003/0205531 A1 | 11/2003 | Koslow |
| 2003/0211802 A1 | 11/2003 | Keck et al. |

(56) References Cited

U.S. PATENT DOCUMENTS

| | | |
|---|---|---|
| 2003/0213750 A1 | 11/2003 | Koslow |
| 2003/0220039 A1 | 11/2003 | Chen et al. |
| 2004/0038014 A1 | 2/2004 | Schaefer et al. |
| 2004/0060268 A1 | 4/2004 | Chung et al. |
| 2004/0060269 A1 | 4/2004 | Chung et al. |
| 2004/0083695 A1 | 5/2004 | Schultink et al. |
| 2004/0112023 A1 | 6/2004 | Choi |
| 2004/0116028 A1 | 6/2004 | Bryner |
| 2004/0123572 A1 | 7/2004 | Chung et al. |
| 2004/0135274 A1 | 7/2004 | Matsuda et al. |
| 2004/0163540 A1 | 8/2004 | Mori et al. |
| 2004/0187454 A1 | 9/2004 | Chung et al. |
| 2004/0211160 A1 | 10/2004 | Rammig et al. |
| 2004/0226886 A1 | 11/2004 | Hester et al. |
| 2004/0255783 A1 | 12/2004 | Graham et al. |
| 2004/0266300 A1 | 12/2004 | Isele et al. |
| 2005/0006303 A1 | 1/2005 | Sanders |
| 2005/0079379 A1 | 4/2005 | Wadsworth et al. |
| 2005/0109393 A1 | 5/2005 | Anderson |
| 2005/0109554 A1 | 5/2005 | Ishikawa et al. |
| 2005/0109557 A1 | 5/2005 | Dravet et al. |
| 2005/0136292 A1 | 6/2005 | Mariani et al. |
| 2005/0148261 A1 | 7/2005 | Close et al. |
| 2005/0193696 A1 | 9/2005 | Muller et al. |
| 2005/0217226 A1 | 10/2005 | Sundet et al. |
| 2005/0240517 A1 | 10/2005 | Wolzenski et al. |
| 2005/0241598 A1 | 11/2005 | Ezaki |
| 2005/0250726 A1 | 11/2005 | Krieg et al. |
| 2005/0266760 A1 | 12/2005 | Chhabra et al. |
| 2006/0000196 A1 | 1/2006 | Beier et al. |
| 2006/0084341 A1 | 4/2006 | Bodaghi et al. |
| 2006/0096260 A1 | 5/2006 | Bryner et al. |
| 2006/0096932 A1 | 5/2006 | Dema et al. |
| 2006/0137317 A1 | 6/2006 | Bryner et al. |
| 2006/0137318 A1 | 6/2006 | Lim et al. |
| 2006/0169144 A1 | 8/2006 | Forslund |
| 2006/0196359 A1 | 9/2006 | Gillingham et al. |
| 2006/0230731 A1 | 10/2006 | Kalayci |
| 2006/0292947 A1 | 12/2006 | LaVietes et al. |
| 2007/0021021 A1 | 1/2007 | Verdegan et al. |
| 2007/0054579 A1 | 3/2007 | Baker et al. |
| 2007/0065643 A1 | 3/2007 | Kopacz et al. |
| 2007/0074628 A1 | 4/2007 | Jones et al. |
| 2007/0075015 A1 | 4/2007 | Bates et al. |
| 2007/0084786 A1 | 4/2007 | Smithies |
| 2007/0125700 A1 | 6/2007 | Ding et al. |
| 2007/0138698 A1 | 6/2007 | Gerndt et al. |
| 2007/0190319 A1 | 8/2007 | Kalayci |
| 2007/0264520 A1 | 11/2007 | Wood et al. |
| 2007/0271883 A1 | 11/2007 | Chung et al. |
| 2007/0283808 A1 | 12/2007 | Chung et al. |
| 2008/0017038 A1 | 1/2008 | Wu |
| 2008/0022643 A1 | 1/2008 | Fox et al. |
| 2008/0026659 A1 | 1/2008 | Brandner et al. |
| 2008/0026661 A1 | 1/2008 | Fox et al. |
| 2008/0032110 A1 | 2/2008 | Wood et al. |
| 2008/0060328 A1 | 3/2008 | Devine |
| 2008/0070463 A1* | 3/2008 | Arora .................. H01M 50/403 442/334 |
| 2008/0105626 A1 | 5/2008 | Jones et al. |
| 2008/0108265 A1 | 5/2008 | Pourdeyhimi et al. |
| 2008/0110822 A1 | 5/2008 | Chung et al. |
| 2008/0134652 A1 | 6/2008 | Lim et al. |
| 2008/0160856 A1 | 7/2008 | Chen et al. |
| 2008/0227919 A9 | 9/2008 | Li et al. |
| 2008/0264259 A1 | 10/2008 | Leung |
| 2008/0302242 A1 | 12/2008 | Schelling et al. |
| 2008/0318014 A1 | 12/2008 | Angadjivand et al. |
| 2009/0017710 A1 | 1/2009 | Bugada et al. |
| 2009/0026137 A1* | 1/2009 | Chen .................. D04H 1/43838 210/490 |
| 2009/0050578 A1 | 2/2009 | Israel et al. |
| 2009/0118451 A1 | 5/2009 | Fuchs et al. |
| 2009/0120048 A1 | 5/2009 | Wertz et al. |
| 2009/0120868 A1 | 5/2009 | Huppchen et al. |
| 2009/0209158 A1 | 8/2009 | Richeson et al. |
| 2009/0261035 A1* | 10/2009 | Arora .................. H01M 50/411 264/289.3 |
| 2009/0266759 A1 | 10/2009 | Green |
| 2010/0000411 A1 | 1/2010 | Wertz et al. |
| 2010/0024695 A1 | 2/2010 | DiFrancia et al. |
| 2010/0031618 A1 | 2/2010 | Grove, III |
| 2010/0044289 A1 | 2/2010 | Koslow |
| 2010/0233927 A1 | 9/2010 | Standaert |
| 2010/0282682 A1 | 11/2010 | Eaton et al. |
| 2010/0285101 A1 | 11/2010 | Moore et al. |
| 2010/0297720 A1 | 11/2010 | Medoff et al. |
| 2010/0320138 A1* | 12/2010 | Waller, Jr. .............. D06M 14/26 210/450 |
| 2010/0323573 A1 | 12/2010 | Chu et al. |
| 2011/0059668 A1 | 3/2011 | Bieser et al. |
| 2011/0079553 A1 | 4/2011 | Thomson et al. |
| 2011/0139706 A1 | 6/2011 | Kalayci et al. |
| 2011/0147301 A1 | 6/2011 | Johnson et al. |
| 2011/0147976 A1 | 6/2011 | Wertz et al. |
| 2011/0151737 A1 | 6/2011 | Moore et al. |
| 2011/0214570 A1* | 9/2011 | Jones .................. B01D 39/1623 95/287 |
| 2011/0215046 A1 | 9/2011 | Rogers et al. |
| 2011/0259813 A1 | 10/2011 | Wertz et al. |
| 2012/0108714 A1 | 5/2012 | Wittner |
| 2012/0152821 A1 | 6/2012 | Cox et al. |
| 2012/0152824 A1 | 6/2012 | Cox et al. |
| 2012/0318754 A1 | 12/2012 | Cox et al. |
| 2014/0144113 A1 | 5/2014 | Wertz et al. |
| 2014/0346107 A1 | 11/2014 | Anantharamaiah et al. |
| 2015/0182885 A1 | 7/2015 | Thomson et al. |
| 2015/0182893 A1 | 7/2015 | Godsay et al. |
| 2015/0360156 A1 | 12/2015 | Swaminathan |
| 2016/0158677 A1 | 6/2016 | Cox et al. |
| 2016/0184751 A1 | 6/2016 | Wertz et al. |
| 2018/0272255 A1 | 9/2018 | Thomson et al. |
| 2019/0126177 A1 | 5/2019 | Cox et al. |
| 2019/0168143 A1 | 6/2019 | Wertz et al. |

FOREIGN PATENT DOCUMENTS

| | | |
|---|---|---|
| DE | 20 2005 019 004 U1 | 4/2007 |
| DE | 10 2005 059 214 B4 | 10/2007 |
| DE | 10 2006 017 553 B3 | 12/2007 |
| DE | 20 2007 015 994 U1 | 1/2008 |
| EP | 0 462 574 A1 | 12/1991 |
| EP | 1 048 335 A1 | 11/2000 |
| EP | 1 236 494 B1 | 9/2002 |
| EP | 1 447 121 A1 | 8/2004 |
| EP | 1 048 335 B1 | 4/2005 |
| EP | 1 721 555 A1 | 11/2006 |
| EP | 1 775 006 A1 | 4/2007 |
| EP | 1 795 248 A2 | 3/2008 |
| EP | 1 483 039 B1 | 4/2008 |
| JP | 2008-095266 A | 4/2008 |
| WO | WO 98/31060 A1 | 7/1998 |
| WO | WO 00/02006 A2 | 1/2000 |
| WO | WO 01/98574 A2 | 12/2001 |
| WO | WO 02/16681 A1 | 2/2002 |
| WO | WO 02/20668 A2 | 3/2002 |
| WO | WO 03/064006 A1 | 8/2003 |
| WO | WO 03/064013 A1 | 8/2003 |
| WO | WO 2004/028662 A2 | 4/2004 |
| WO | WO 2004/069378 A2 | 8/2004 |
| WO | WO 2004/112937 A1 | 12/2004 |
| WO | WO 2005/034659 A2 | 4/2005 |
| WO | WO 2006/030407 A1 | 3/2006 |
| WO | WO 2006/049664 A1 | 5/2006 |
| WO | WO 2006/053295 A1 | 5/2006 |
| WO | WO 2006/071979 A1 | 7/2006 |
| WO | WO 2006/071980 A1 | 7/2006 |
| WO | WO 2006/096180 A1 | 9/2006 |
| WO | WO 2007/024445 A1 | 3/2007 |
| WO | WO 2007/041310 A2 | 4/2007 |
| WO | WO 2007/041311 A2 | 4/2007 |
| WO | WO 2007/068302 A1 | 6/2007 |
| WO | WO 2007/068408 A1 | 6/2007 |
| WO | WO 2007/068444 A1 | 6/2007 |

(56) References Cited

FOREIGN PATENT DOCUMENTS

| WO | WO 2007/076015 A2 | 7/2007 |
|---|---|---|
| WO | WO 2007/112443 A2 | 10/2007 |
| WO | WO 2008/011450 A1 | 1/2008 |
| WO | WO 2008/016771 A1 | 2/2008 |
| WO | WO 2008/057397 A1 | 5/2008 |
| WO | WO 2008/057431 A2 | 5/2008 |
| WO | WO 2008/066813 A2 | 6/2008 |
| WO | WO 2008/150548 A2 | 12/2008 |
| WO | WO 2009/062009 A2 | 5/2009 |
| WO | WO 2009/085679 A1 | 7/2009 |
| WO | WO 2010/101640 A1 | 9/2010 |
| WO | WO 2011/058118 A1 | 5/2011 |

OTHER PUBLICATIONS

Extended European Search Report for EP 13807086.7 dated Jan. 14, 2016.
International Preliminary Report on Patentability for Application No. for PCT/US2011/065499 dated Jun. 27, 2013.
International Preliminary Report on Patentability for PCT/US2013/046746 dated Dec. 31, 2014.
International Search Report and Written Opinion for PCT/US2011/065499 dated Apr. 20, 2012.
International Search Report and Written Opinion for PCT/US2013/046746 dated Nov. 5, 2013.
[No Author Listed] Polymer Degradation and Stability research Developments. Albertov, Ed. 2007. Nova Science Publishers. Book Description and Table of Contents. Accessed from <https://www.novapublishers.com/catalog/product_info.php?products_id=5855> on Sep. 17, 2015.
[No Author Listed], BET Specific Surface Area Analysis and Testing. Accessed Aug. 2, 2017. Particle Technology.
Berkalp, Air Permeability & Porosity in Spun-laced Fabrics. Fibres and Textiles in Eastern Europe. 2006; 14(3): 81-5.
Bresee et al. Influence of Processing Conditions on Melt Blown Web Structure: Part 1—DCD. INJ Spring 2004, p. 49-55.
Bresee et al. Influence of Processing Conditions on Melt Blown Web Structure: Part 2—Primary Airflow Rate. INJ Summer 2005, p. 11-8.
Bresee et al. Influence of Processing Conditions on Melt Blown Web Structure: Part 3—Water Quench. INJ Winter 2005, p. 27-35.
Chung, Extrusion of Polymers, Theory and Practice. 2nd Edition; Sample Chapter 2: Physical Description of Single-Screw Extrusion. Hanser Publishers, Munich: 46 pages.
Dahiya et al., Melt Blown Technology. Apr. 2004. 13 pages.
Dutton, Overview and Analysis of the Meltblown Process and Parameters. NC State University, College of textiles. Journal of Textile and Apparel, Technology and Management. 2008;6(1):1-25.
Ellison et al., Melt blown nanofibers: Fiber diameter distributions and onset of fiber breakup. Polymer. May 21, 2007;48(11):3306-16.
Grafe et al., Polymeric Nanofibers and Nanofiber Webs: A New Class of Nonwovens. INJ Spring 2003: 51-5.
John Wiley & Sons, Inc. MP Groover. Fundamentals of Modern Manufacturing. Slide 4. Extrusion Die for Solid Cross Section. 2005.
Keith et al., The Surface Area of Fibrous Filters. Tobacco Science. 1977;68-72. Accessed Sep. 19, 2013.
Nayak, Fabrication and characterization of polypropylene nanofibres by melt electrospinning and meltblowing. Doctoral Thesis. RMIT University, School of Fashion and Textiles. Mar. 2012.
Phifer et al., Relationship Between Oil Absorption and Microstructure of Calendered and Noncalendered Polyester and Polypropylene Meltblown Material. Journal of Food Quality. 1993;16:25-33.
Podgórski et al., Application of nanofibers to improve the filtration efficiency of the most penetrating aerosol particles in fibrous filters. Chem Eng Sci. Oct. 2006;61(20):6804-15.
Shin et al., A Fundamental Investigation of the Formation and Properties of Electrospun Fibers. National Textile Center Annual Report. Nov. 2001; M98-D01: 9 pages.
Warner et al., A Fundamental Investigation of the Formation and Properties of Electrospun Fibers. National Textile Center Annual Report. Nov. 1999; M98-D01: 10 pages.
EP 11864804.7, Oct. 7, 2015, Extended European Search Report.
EP 13807086.7, Jan. 14, 2016, Extended European Search Report.
PCT/US2011/065499, Jun. 27, 2013, International Preliminary Report on Patentability.
PCT/US2013/046746, Dec. 31, 2014, International Preliminary Report on Patentability.
PCT/US2011/065499, Apr. 20, 2012, International Search Report and Written Opinion.
PCT/US2013/046746, Nov. 5, 2013, International Search Report and Written Opinion.

* cited by examiner

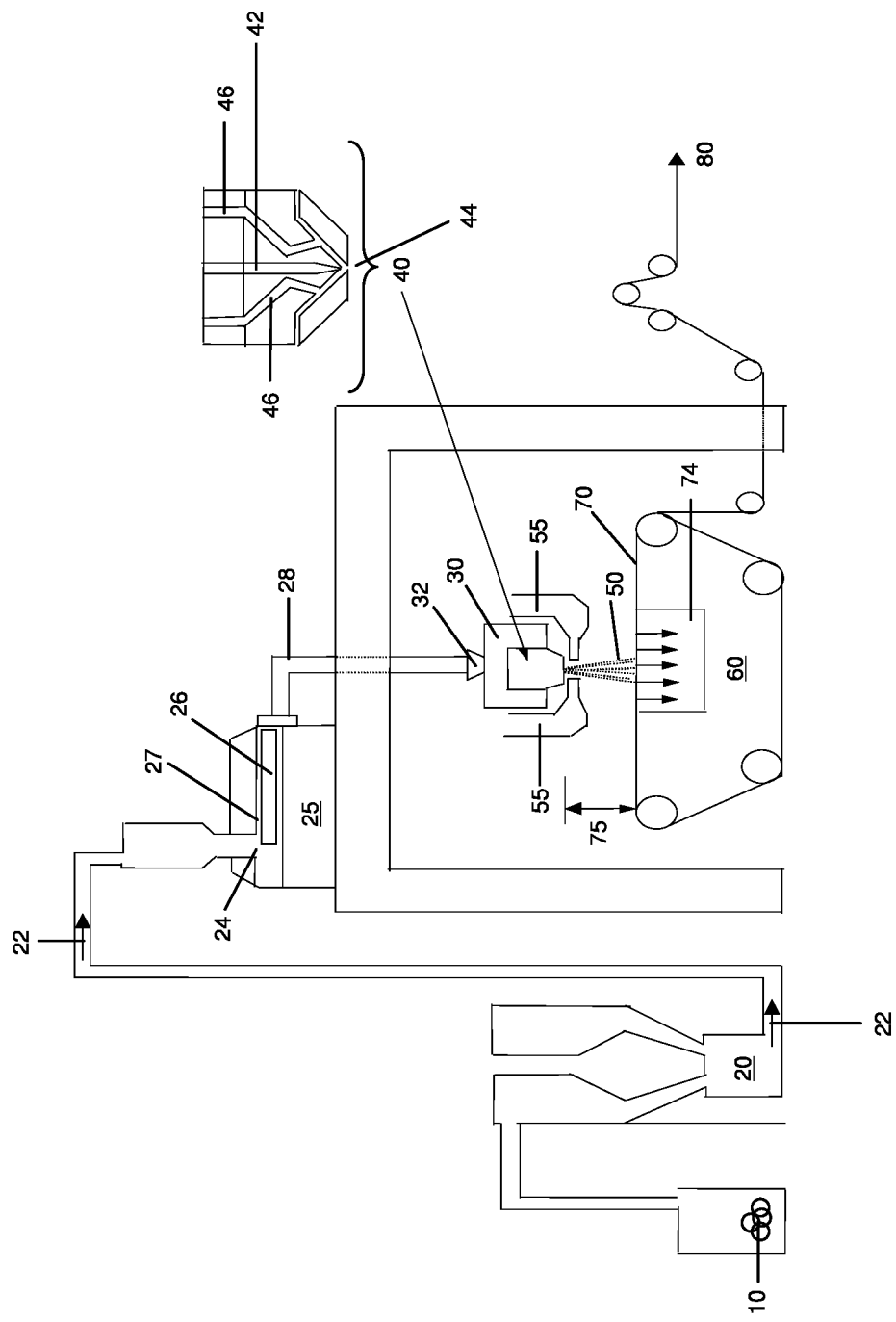

FINE FIBER FILTER MEDIA AND PROCESSES

CROSS REFERENCE TO RELATED APPLICATIONS

The present application is a continuation of U.S. application Ser. No. 16/170,350, filed Oct. 25, 2018, which is a continuation of U.S. patent application Ser. No. 13/528,796 (now U.S. Pat. No. 10,155,186), filed Jun. 20, 2012, which is a continuation-in-part of U.S. patent application Ser. No. 12/971,539 (now abandoned), filed on Dec. 17, 2010 and U.S. patent application Ser. No. 12/971,594 (now Abandoned), filed on Dec. 17, 2010, which are hereby incorporated by reference in their entireties.

FIELD

Fine fiber products, including those suitable for use as filter media, as well as related assemblies, systems and methods, are described.

BACKGROUND

Filter media can be used to remove contamination in a variety of applications. Depending on the application, the filter media may be designed to have different performance characteristics. In general, filter media can be formed of a web of fibers. The fiber web provides a porous structure that permits fluid (e.g., a liquid or a gas) to flow through the filter media. Contaminant particles contained within the fluid may be trapped on the fibrous web. Filter media characteristics, such as fiber diameter and basis weight, affect filter performance including filter efficiency and resistance to fluid flow through the filter.

Fiber webs can be formed by different processes. In a meltblowing process, a fiber web may be formed by extruding a polymeric material through a die and then attenuating the resulting filaments with a heated, high-velocity air stream. This process may generate fine fibers that can be collected onto a moving collector belt where they intertwine with each other to form a fiber web. There are several parameters during the extrusion process that can affect the structural and performance characteristics of the resulting fiber webs. Improvements in the extrusion process may lead to fiber webs having improved structural and performance characteristics, such as reduced fiber diameters, increased surface area, and/or reduced basis weight. Such improvements would find use in a number of different fields where fiber webs can be used, such as in filtration applications.

SUMMARY

The disclosure generally relates to fine fiber products, as well as related assemblies, systems and methods.

In some embodiments, a series of fiber webs are provided. In one set of embodiments, a fiber web includes a plurality of meltblown fibers formed of a polymeric material and having an average fiber diameter between about 0.1 microns and about 1.5 microns. The fiber web has an air permeability between about 10 CFM and about 1800 CFM, a surface area between about 0.1 m$^2$/g and about 6.0 m$^2$/g, a basis weight between about 1.0 g/m$^2$ and about 100 g/m$^2$, and a thickness between about 0.0005 inches and about 0.04 inches. The fiber web also has a surface density of particles formed of the polymeric material of less than about 1.6 particles/in$^r$, wherein each of the particles has a largest cross-sectional dimension of about 1.0 mm or greater.

In another set of embodiments, a fiber web includes a fiber web comprising a plurality of meltblown fibers having an average fiber diameter between about 0.1 microns and about 1.5 microns. The fiber web has a mean pore size of greater than about 0.1 microns and less than about 2.0 micron. The fiber web has a water permeability of greater than about 0.2 ml/min·cm$^2$·psi, and a permeate turbidity of less than about 8 NTU. The fiber web also has a basis weight between about 15 g/m$^2$ and about 200 g/m$^2$ and a thickness between about 0.002 inches and about 0.02 inches.

In another set of embodiments, a fiber web comprises a plurality of meltblown fibers having an average fiber diameter between about 0.1 microns and about 1.5 microns. The fiber web has a mean pore size of greater than about 0.1 microns and less than about 2.0 microns. The fiber web may have a ratio of bubble point to mean pore size of less than about 3:1. The fiber web may have a water permeability of greater than about 0.2 ml/min·cm$^2$·psi. Additionally, the fiber web may have a solidity of greater than or equal to about 10% and less than about 70%. The fiber web may have a basis weight between about 15 g/m$^2$ and about 200 g/m$^2$. The fiber web may have a thickness between about 0.002 inches and about 0.02 inches.

In another set of embodiments, a fiber web includes a plurality of meltblown fibers formed of a polymeric material and having an average fiber diameter between about 0.1 microns and about 0.6 microns. The fiber web has an air permeability between about 10 CFM and about 1800 CFM, a surface area between about 0.1 m$^2$/g and about 6.0 m$^2$/g, a basis weight between about 1.0 g/m$^2$ and about 100 g/m$^2$, and a thickness between about 0.0005 inches and about 0.04 inches. The fiber web also has a surface density of particles formed of the polymeric material of less than about 5 particles/in$^r$, wherein each of the particles has a largest cross-sectional dimension of about 1.0 mm or greater.

In another set of embodiments, a fiber web includes a plurality of meltblown fibers having an average fiber diameter between about 0.1 microns and about 1.5 microns. The fiber web has an air permeability between about 10 and about 1800 CFM, a surface area greater than about 2.0 m$^2$/g, a basis weight between about 1.0 g/m$^2$ and about 100 g/m$^2$, and a thickness between about 0.0005 inches and about 0.04 inches.

In some embodiments, a series of methods of forming fiber webs is provided. In one set of embodiments, a method of forming a fiber web includes introducing a polymeric material into an extrusion system including an extruder inlet, a die outlet, and a processing space between the extruder inlet and the die outlet, wherein the extrusion system comprises a extruder barrel having an inner diameter of about 4 inches or less, and processing the polymeric material in the extrusion system such that the polymeric material has a dwell time of less than about 85 minutes in the processing space. The method also includes forming a plurality of meltblown fibers from the polymeric material, wherein the plurality of meltblown fibers have an average diameter between about 0.1 microns and about 1.5 microns, and forming a fiber web comprising the plurality of meltblown fibers.

In another set of embodiments, a method of forming a fiber web includes introducing a polymeric material into an extrusion system including an extruder inlet, a die outlet, and a processing space between the extruder inlet and the die outlet having a volume of less than about 25,000 cm$^3$. The method also includes forming a plurality of meltblown fibers from the polymeric material, wherein the plurality of meltblown fibers have an average diameter between about 0.1 microns and about 1.5 microns, and forming a fiber web comprising the plurality of meltblown fibers.

In another set of embodiments, a method of forming a fiber web includes introducing a polymeric material into an extrusion system including an extruder inlet, a die outlet, and a processing space between the extruder inlet and the die outlet, and processing the polymeric material in the extrusion system such that the polymeric material has a dwell time in the processing space of less than about 30 minutes and a throughput of less than about 85 lbs/hr. The method also includes forming a plurality of meltblown fibers from the polymeric material, wherein the plurality of meltblown fibers have an average diameter between about 0.1 microns and about 1.5 microns, and forming a fiber web comprising the plurality of meltblown fibers.

In another set of embodiments, a method of forming a fiber web includes introducing a polymeric material into an extrusion system including an extruder inlet, a die outlet, and a processing space between the extruder inlet and the die outlet, and processing the polymeric material in the extrusion system such that the polymeric material has a dwell time in the processing space of less than about 50 minutes and a throughput of less than about 55 lbs/hr. The method also includes forming a plurality of meltblown fibers from the polymeric material, wherein the plurality of meltblown fibers have an average diameter between about 0.1 microns and about 1.5 microns, and forming a fiber web comprising the plurality of meltblown fibers.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE FIGURES

Non-limiting embodiments of the present invention will be described by way of example with reference to the accompanying FIGURE, which is schematic and is not intended to be drawn to scale. In the FIGURE, each identical or nearly identical component illustrated is typically represented by a single numeral. For purposes of clarity, not every component is labeled, nor is every component of each embodiment of the invention shown where illustration is not necessary to allow those of ordinary skill in the art to understand the invention. In the FIGURE:

FIG. 1 is a schematic diagram showing a process for fiber formation according to one set of embodiments.

DETAILED DESCRIPTION

Fine fiber products including fiber webs, as well as related assemblies, systems and methods, are described. In some embodiments, fiber webs described herein may include fine fibers and relatively low amounts of degraded polymer formed during a fiber extrusion process. Polymer degradation may result in the formation of polymeric particles, which may lessen the properties of fiber webs used for filter media or other applications. Polymer degradation may be decreased by, for example, decreasing the amount of time (e.g., dwell time) the polymeric material spends at relatively high temperatures and pressures in certain portions of the extrusion system. Factors influencing this decreased dwell time are balanced with the desire to form fibers having small diameters which in certain conventional processes are produced at longer dwell times. In some embodiments, fiber webs described herein have a relatively low air permeability and a relatively high surface area, which can lead to increased performance. Other advantages of the articles, methods and systems described herein are also provided.

This disclosure describes several methods for addressing some problems associated with certain polymer fiber extrusion processes. One problem involves the formation of fibers having very small diameters. As described in more detail below, generally the formation of fibers having very small diameters in certain extrusion processes uses a relatively low polymer throughput. However, a low throughput may lead to the formation of degraded polymeric material in the form of particles during an extrusion process. This degradation may be caused by the polymeric material being subjected to the relatively high temperatures and pressures of the extrusion process for prolonged periods of time and/or to other conditions. As the amount of degraded polymer increases, less fiber is produced per unit of polymer. For fiber webs used for filtration or certain other applications, this occurrence is not desirable as it may result in having to form fiber webs having a higher basis weight in order to achieve the same level of performance as fiber webs without degraded polymer, all other factors being equal.

In the past, increased amounts of degraded polymer formed during an extrusion process sometimes results in the practitioner having to change certain parameters of the extrusion process to reduce the amount of degraded polymer; however, these changes may lead to the formation of fibers having relatively larger diameters and/or fiber webs having less desirable performance characteristics. The inventors have discovered within the context of the invention that by balancing certain parameters of an extrusion process and/or by including one or more additives to the polymeric material used to form the fibers, fine fiber webs having relatively low amounts of polymer degradation, increased performance, and/or better structural characteristics can be achieved. Examples of parameters that can be varied and additives that can be used to achieve this result are described in more detail below.

Although much of the description provided herein refers to a fiber web or a meltblown product used as filter media, it should be understood that the fiber web and/or meltblown product can be used in other applications in other embodiments.

FIG. 1 shows a system 1 that may be used in methods that form fine fibers according to certain embodiments described herein. As shown in this illustrative embodiment, a polymeric material 10, such as a resin which may be in granular form, may be introduced into a mixer 20, where the polymeric material can be optionally combined with one more additives. The polymeric material may then be transported in the direction of arrows 22 towards an inlet 24 of an extruder 25. The extruder includes an extruder screw 26 that is mounted for rotation within an extruder barrel 27. Through the rotation of the screw, polymeric material is conveyed downstream within the extruder barrel, which may be heated to a desired temperature to create a fluid stream of polymeric material. The polymer is heated (generally slowly) from the inlet of the extruder to the outlet of the extruder to allow the polymeric material to flow more easily. The stream of polymeric material may then flow into one or more conduits 28 fluidically connecting the extruder to a die body 30 (e.g., connecting the extruder outlet to a die body inlet). The volume between the extruder inlet and a die outlet 44 collectively define a processing space having a particular internal volume that can be used to calculate the dwell time of the polymeric material, as described in more detail below.

As shown illustratively in FIG. 1, a melt pump 32 may be positioned between conduit 28 and the die body. The melt pump can help control the amount of polymer throughput (lb/hr) delivered to the die body. The die body has a die temperature which influences the temperature of the polymeric material in the die body, including the temperature of the polymer in a spin pack 40 connected to the die body. The spin pack may include one or more channels 42 allowing the polymer to flow towards a die outlet 44 (e.g., a die tip) including one or more holes. The spin pack also includes one or more additional channels 46 which can allow air or other gases to flow towards the die tip. As the melted polymer exits the one or more die outlets, the air flowing in channels 46 attenuates the polymer into fibers. Fiber formation can be controlled by modifying the process air temperature and process air volume.

The polymer exiting the one or more holes of the die outlet is formed into meltblown fibers 50 onto a collector table 60 which includes a collector belt 70. The diameter of the fibers may be controlled in part by air or other gases introduced into channels 55, which can be used to quench the fibers. The heated, high velocity air impinges the polymer on either side of the die outlet as the polymer exits out of the die outlet. This air may attenuate the fiber to the final fiber size. Quenching can be controlled by modifying the quench air temperature and quench air volume.

The fibers collected onto the collector belt may be pulled towards the collector table using a suction box 74. The fibers collected onto the collector belt form a fiber web. The distance 75 from the die tip to the collector table can be varied to control the density of the fiber web (e.g., as the distance is increased, the fiber velocity is decreased and the fiber temperature is reduced so packing of the fibers is less dense, resulting in a more lofty web). As the distance is increased, the velocity of the fiber is generally decreased, making a loftier fiber web. The collector suction is also controlled, which also impacts the loft of the fiber web. The basis weight and thickness of the fiber web can be varied by controlling the collector belt speed. The collector belt transports the fiber web to a winder 80 where the fiber web can be further processed if desired.

In certain embodiments, a method of forming a fiber web may involve controlling the dwell time of the polymeric material in a processing space of a system such as the one shown in FIG. 1. The dwell time is the time the polymeric material spends in a processing space, which includes the combined volume where the polymeric material can reside between an extruder inlet and a die outlet, within the temperature- and pressure-controlled confines of the extrusion process. The combined volume may include, for example, the volume of the extruder (e.g., extruder barrel), die body, and any conduits fluidically connecting the extruder and die body. The dwell time can be calculated using the formula:

$$\text{Dwell time} = V \cdot \rho / Th \quad (1)$$

where V is the volume of the processing space as defined above, ρ is the density of the polymeric material being extruded, and Th is the throughput of the polymeric material through the die body.

Without wishing to be bound by any theory, the inventors believe that in some embodiments, in order to form fine fiber webs, relatively low throughputs may be used during the extrusion process. Relatively low throughputs allow fibers having small diameters to be formed; however, low throughputs may also result in a certain amount of the polymeric material used to form the fibers to become degraded due to the polymeric material being subjected to the relatively high temperatures and pressures of the extrusion process for prolonged periods of time (i.e., a relatively high dwell time). Degradation may result in the formation of small polymeric particles as described in more detail below, which may lessen the filtration properties of the fiber web. If relatively high throughputs are used, the dwell time of the polymeric material decreases; however, fibers having larger diameters may be formed. As a result, in some embodiments a suitable process for forming fine fibers with low polymer degradation may involve balancing both the throughput and the dwell time of the polymeric material during the extrusion process.

The inventors have recognized within the context of the invention that one method for decreasing the dwell time of the polymeric material while obtaining small fiber diameters is to decrease the volume of the processing space. As the processing space includes the combined volume between an extruder inlet and a die outlet, the volume of the processing space may be decreased by, for example, decreasing the diameter and/or length of the extruder barrel, decreasing the number, diameter and/or length of any conduits connecting the extruder and die body, decreasing the internal volume of the die body, and combinations thereof. Using a relatively low processing space volume during an extrusion process can allow, in some embodiments, a relatively low polymer throughput to be used, while still maintaining a relatively low dwell time. As such, fine fiber webs having relatively low polymer degradation may be formed.

The inventors have also observed within the context of the invention that in some embodiments, the temperature of the polymeric material in the processing space may have relatively little effect on the amount of polymer degradation, e.g., compared to the dwell time. One of ordinary skill in the art would have expected that polymer degradation was caused by the polymeric material being subjected to the relatively high temperatures (and pressures) during the extrusion process. Accordingly, to decrease the amount of polymer degradation, one of ordinary skill in the art would likely decrease the temperature of the polymeric material in the extruder and/or die body. One of ordinary skill in the art would not have expected that low amounts of polymer degradation can be achieved while using relatively high processing temperatures in combination with modifying other parameters as described in certain methods provided herein.

As noted above, in some embodiments, a method of forming a fiber web may involve controlling the dwell time of the polymeric material in a processing space of an extrusion system. In certain embodiments, the dwell time may range between about 1 minute and about 2,600 minutes. For example, the dwell time of the polymeric material may be between about 1 minute and about 1,500 minutes, between about 2 minutes and about 1,000 minutes, between about 2 minutes and about 500 minutes, between about 2 minutes and about 100 minutes, between about 3 minutes and about 90 minutes, between about 5 minutes and about 76 minutes, between about 5 minutes and about 50 minutes, between about 5 minutes and about 30 minutes, or between about 1 minute and about 15 minutes. In some embodiments, the dwell time of a polymeric material in a processing space is less than about 2,000 minutes, less than about 1,500 minutes, less than about 1,000 minutes, less than about 500 minutes, less than about 200 minutes, less than about 100 minutes, less than about 75 minutes, less than about 50 minutes, less than about 30 minutes, less than about 20 minutes, less than about 15 minutes, less than about 10 minutes, or less than about 5 minutes. Other ranges and values of dwell time are also possible.

The polymer throughput may range, for example, between about 1 lb/hour and about 200 lbs/hour. For instance, the polymer throughput may be between about 1lb/hour and 150 lbs/hours, between about 1 lb/hour and 100 lbs/hour, between about 2 lbs/hour and about 90 lbs/hour, between about 20 lbs/hour and about 85 lbs/hour, between about 20 lbs/hour and about 60 lbs/hour, between about 40 lbs/hour and about 85 lbs/hour, or between about 1 lb/hour and 20 lbs/hour. In some embodiments, the polymer throughput may be less than about 200 lbs/hour, less than about 150 lbs/hour, less than about 100 lbs/hour, less than about 85 lbs/hour, less than about 60 lbs/hour, less than about 40 lbs/hour, less than about 20 lbs/hour. In other embodiments, the polymer throughput may be greater than about 20 lbs/hour, greater than about 40 lbs/hour, greater than about 85 lbs/hour, greater than about 100 lbs/hour, greater than about 150 lbs/hour, or greater than about 200 lbs/hour. Other ranges and values of polymer throughput are also possible.

The volume of the processing space where polymeric material can reside may be varied in some embodiments, e.g., to achieve a particular dwell time. The volume of the processing space may range, for example, between about 10 cm$^3$ and about 30,000 cm$^3$, between about 10 cm$^3$ and about 25,000 cm$^3$, between about 10 cm$^3$ and about 20,000 cm$^3$, between about 10 cm$^3$ and about 15,000 cm$^3$, between about 10 cm$^3$ and about 12,000 cm$^3$, between about 10 cm$^3$ and about 10,000 cm$^3$, between about 10 cm$^3$ and about 8,000 cm$^3$, between about 10 cm$^3$ and about 6,000 cm$^3$, between about 10 cm$^3$ and about 4,000 cm$^3$, between about 10 cm$^3$ and about 2,000 cm$^3$, between about 10 cm$^3$ and about 1,000 cm$^3$, or between about 10 cm$^3$ and about 500 cm$^3$. In some cases, the volume of the processing space is less than about 30,000 cm$^3$, less than about 25,000 cm$^3$, less than about 20,000 cm$^3$, less than about 15,000 cm$^3$, less than about 12,000 cm$^3$, less than about 10,000 cm$^3$, less than about 8,000 cm$^3$, less than about 6,000 cm$^3$, less than about 4,000 cm$^3$, less than 2,000 cm$^3$, less than about 1,000 cm$^3$, or less than about 500 cm$^3$. Other ranges and values of processing space volume are also possible.

The size of the extruder screw (e.g., screw diameter) may be varied in some embodiments, e.g., to achieve a particular processing space volume. In some embodiments, the extruder screw diameter may be between about 0.25 and about 6.0 inches. For instance, the extruder screw diameter may be between about 0.25 inches and about 5.5 inches, between about 0.5 inches and about 5.0 inches, between about 1.0 inch and about 4.0 inches, between about 1.0 inch and about 3.5 inches, or between about 1.0 inch and about 3.0 inches. In some cases, extruder screw diameter may be about 6.0 inches or less, about 5.5 inches or less, about 5.0 inches or less, about 4.5 inches or less, about 4.0 inches or less, about 3.5 inches or less, about 3.0 inches or less, about 2.5 inches or less, about 2.0 inches or less, or about 1.5 inches or less. Other ranges and values of extruder screw diameters are also possible.

The extruder barrel diameter (e.g., the inner diameter of the barrel) may be varied in some embodiments and may be chosen to match the size of the extruder screw. For example, an extruder screw having a 4 inch diameter may be matched with an extruder barrel having an inner diameter of about 4.0 inches. In some embodiments, the extruder barrel may have an inner diameter of between about 0.25 and about 6.0 inches. For instance, the inner diameter of the extruder barrel may be between about 0.25 inches and about 5.5 inches, between about 0.5 inches and about 5.0 inches, between about 1.0 inch and about 4.0 inches, between about 1.0 inch and about 3.5 inches, or between about 1.0 inch and about 3.0 inches. In some cases, the inner diameter of the extruder barrel may be about 6.0 inches or less, about 5.5 inches or less, about 5.0 inches or less, about 4.5 inches or less, about 4.0 inches or less, about 3.5 inches or less, about 3.0 inches or less, about 2.5 inches or less, about 2.0 inches or less, or about 1.5 inches or less. Other ranges and values of extruder barrel inner diameters are also possible.

In certain embodiments, the length of the extruder barrel may be varied, e.g., to achieve a particular processing space volume. In some embodiments, the length of the extruder barrel may be between about 1 ft and about 15 ft. For instance, the length of the extruder barrel may be between about 1 ft and about 12 ft, between about 1 ft and about 10 ft, between about 1 ft and about 8 ft, between about 1 ft and about 6 ft, between about 1 ft and about 5 ft, between about 1 ft and about 4 ft, or between about 1 ft and about 2 ft. In some cases, the length of the extruder barrel is about 15 ft or less, about 12 ft or less, about 10 ft or less, about 8 ft or less, about 6 ft or less, about 5 ft or less, about 4 ft or less, about 3 ft or less, or about 2 ft or less. Other ranges and values of extruder barrel lengths are also possible.

In certain embodiments, the average diameter of one or more conduits between an extruder outlet and a die inlet (e.g., space where a polymeric material can reside) may be varied, e.g., to achieve a particular processing space volume. In some embodiments, the average conduit diameter may be between about 0.1 and about 10.0 inches. For instance, the average conduit diameter may be between about 0.3 inches and about 8.0 inches, between about 0.3 inches and about 5.0 inches, between about 0.1 inches and about 3.0 inches, between about 0.1 inches and about 2.0 inches, between about 0.5 inches and about 2.0 inches, between about 0.1 inches and about 1.8 inches, between about 0.1 inches and about 1.6 inches, between about 0.1 inches and about 1.4 inches, between about 0.1 inches and about 1.2 inches, between about 0.1 inches and about 1.0 inches, or between about 0.1 inches and about 0.8 inches. In some cases, the average conduit diameter is about 10.0 inches or less, about 8.0 inches or less, about 6.0 inches or less, about 4.0 inches or less, about 3.0 inches or less, about 2.0 inches or less, about 1.8 inches or less, about 1.6 inches or less, about 1.4 inches or less, about 1.2 inches or less, about 1.0 inches or less, about 0.8 inches or less, or about 0.7 inches or less. Other ranges and values of average conduit diameters are also possible.

In certain embodiments, the combined length of one or more conduits between an extruder outlet and a die inlet (e.g., space where a polymeric material can reside) may be varied, e.g., to achieve a particular processing space volume. In some embodiments, the combined conduit length may be between about 0.5 ft and about 75 ft. For instance, the combined conduit length may be between about 5 ft and about 50 ft, between about 5 ft and about 40 ft, between about 5 ft and about 30 ft, between about 10 ft and about 25 ft, between about 5 ft and about 25 ft, between about 5 ft and about 20 ft, between about 5 ft and about 15 ft, between about 1 ft and about 12 ft, between about 1 ft and about 10 ft, between about 1 ft and about 8 ft. In some cases, the conduit length may be about 75 ft or less, about 50 ft or less, about 40 ft or less, about 30 ft or less, about 25 ft or less, about 20 ft or less, about 15 ft or less, about 12 ft or less, about 10 ft or less, about 8 ft or less, or about 6 ft or less. Other ranges and values of combined conduit lengths are also possible.

The volume of the die body (including the spin pack) where polymeric material can reside may be varied in some embodiments. The volume of the die body may range, for example, between about 300 cm$^3$ and about 15,000 cm$^3$, between about 300 cm$^3$ and about 13,000 cm$^3$, between about 300 cm$^3$ and about 11,000 cm$^3$, between about 300 cm$^3$ and about 9,000 cm$^3$, between about 300 cm$^3$ and about 6,000 cm$^3$, between about 300 cm$^3$ and about 4,000 cm$^3$, between about 300 cm$^3$ and about 2,000 cm$^3$, between about 300 cm$^3$ and about 1,000 cm$^3$, or between about 300 cm$^3$ and about 600 cm$^3$. In some cases, the volume of the die body is 15,000 cm$^3$, less than about 13,000 cm$^3$, less than about 10,000 cm$^3$, less than about 8,000 cm$^3$, less than about 6,000 cm$^3$, less than about 4,000 cm$^3$, less than 2,000 cm$^3$, less than about 1,000 cm$^3$, or less than about 600 cm$^3$. Other ranges and values of die volume are also possible.

In some embodiments, an extrusion process described herein may include a particular die temperature range or value. In general, the die temperature may be selected to suitably soften (e.g., melt) the polymeric material that is to be formed into fibers. In some embodiments, the die temperature is between about 400° F. and about 630° F. For instance, the die temperature may be between about 410° F. and about 600° F., between about 410° F. and about 580° F., between about 420° F. and about 550° F., or between about 420° F. and about 500° F. In certain embodiments, the die temperature may be greater than about 400° F., greater than about 420° F., greater than about 440° F., greater than about 460° F., greater than about 480° F., or greater than about 500° F. In other embodiments, the die temperature may be less than about 630° F., less than about 550° F., less than about 500° F., or less than about 450° F. Other ranges and values of die temperatures are also possible.

The temperature of the extruder barrel typically varies from the inlet of the extruder to the outlet of the extruder to allow the polymeric material to flow more easily. The minimum temperature used to heat the polymer in the extruder barrel may be, for example, at least about 300° F., at least about 350° F., at least about 400° F., or at least about 420° F. The maximum temperature of the extruder barrel may be, for example, between about 400° F. and about 630° F. For instance, the maximum temperature of the extruder barrel may be between about 410° F. and about 600° F., between about 410° F. and about 580° F., between about 420° F. and about 550° F., between about 420° F. and about 480° F., or between about 420° F. and about 500° F. In certain embodiments, the maximum temperature of the extruder barrel may be greater than about 400° F., greater than about 420° F., greater than about 440° F., greater than about 460° F., greater than about 480° F., or greater than about 500° F. In other embodiments, the maximum temperature of the extruder barrel may be less than about 630° F., less than about 550° F., less than about 500° F., or less than about 450° F. In some embodiments, the maximum temperature of the extruder barrel is at least about 10° F. lower, at least about 20° F. lower, at least about 30° F. lower, or at least about 40° F. lower than the temperature of the die body. Other ranges and values of temperatures of the extruder barrel are also possible.

The process air temperature may also be varied. In some embodiments, the process air temperature may be between about 400° F. and about 630° F. For instance, the process air temperature may be between about 410° F. and about 600° F., between about 410° F. and about 580° F., between about 420° F. and about 550° F., between about 440° F. and about 530° F., or between about 420° F. and about 500° F. Other ranges and values of process air temperatures are also possible.

In some embodiments, it may be desirable to vary the process air volume. As described above, the process air is the heated air on either side of the die tip where the fibers are formed. This heated air (typically the same temperature as the die tip) impinges the fibers and helps attenuate the fibers to the final fiber size. It is believed that, in some embodiments, as the air volume increases, the fiber diameter can decrease. The process air volume can be selected as appropriate. In some embodiments, the process air volume may be between about 1,000 pounds/hour-meter (lbs/hr·m) and about 4,000 lbs/hr·m. For instance, the process air volume may be between about 1,500 lbs/hr·m and about 3,800 lbs/hr·m, between about 2,500 lbs/hr·m and about 3,750 lbs/hr·m, or between about 3,000 lbs/hr·m and about 3,500 lbs/hr·m. Other ranges and values of process air volumes are also possible.

The quench air temperature may also be varied. In some embodiments, the quench air temperature may be between about 0° F. and about 200° F. For instance, the quench air temperature may be between about 0° F. and about 150° F., between about 0° F. and about 100° F., between about 0° F. and about 75° F., between about 0° F. and about 50° F., between about 0° F. and about 30° F., or between about 0° F. and about 20° F. Other ranges and values of quench air temperatures are also possible.

In some embodiments, it may be desirable to vary the quench air volume. In some embodiments, the quench air volume may be between about 0 pounds/hour (lbs/hr) and about 750 lbs/hr. For instance, the quench air volume may be between about 0 lbs/hr and about 500 lbs/hr, between about 0 lbs/hr and about 250 lbs/hr, or between about 0 lbs/hr and about 150 lbs/hr. Other ranges and values of quench air volumes are also possible.

The size of the die outlets (e.g., holes) and number of outlets per inch for the die can generally be selected as desired. In some embodiments, the die can have about 35 holes per inch with 0.0125" holes. In certain embodiments, the die can have about 70 holes per inch with 0.007" holes. In some embodiments, the die can have from about 25 holes per inch to about 250 holes per inch. In certain cases, the die may include about 35 holes per inch or greater, about 50 holes per inch or greater, or about 70 holes per inch or greater. Other dies can optionally be used.

In some embodiments, the distance from the die tip to the collector may be varied. The distance from the die tip to the collector may be, for example, between about 3 inches and about 80 inches. For instance, the distance from the die tip to the collector may be between about 3 inches and about 50 inches, between about 4 inches and about 40 inches, between about 5 inches and about 25 inches, or between about 6 inches and about 15 inches. Other ranges and values of distances from the die tip to the collector are also possible.

The vacuum level created by the suction box can be selected as appropriate. In some embodiments, the vacuum level may be between about 1 inches of water and about 60 inches of water. For instance, the vacuum level may be between about 10 inches of water and about 50 inches of water, between about 20 inches of water and about 40 inches of water, between about 20 inches of water and about 30 inches of water, or between about 30 inches of water and about 40 inches of water.

The line speed at which the collector belt moves can be selected as desired to form a fiber web. In some embodiments, the collector belt may move at a line speed between about 1 ft/min and about 400 ft/min. For instance, the collector belt may move at a line speed between about 10 ft/min and about 200 ft/min, between about 50 ft/min and about 150 ft/min, between about 50 ft/min and about 100 ft/min, or between about 75 ft/min and about 150 ft/min.

It should be understood that the values and ranges of the parameters described above can be used in different combinations to control fiber formation during an extrusion process. For example, in some embodiments a relatively low dwell time and a relatively low throughput may be used to form fine fibers. For instance, in one set of embodiments, a method may include subjecting the polymeric material to a dwell time of less than about 30 minutes and a throughput of less than about 85 lbs/hr. In another set of embodiments, the polymeric material may have a dwell time of less than about 50 minutes and a throughput of less than about 55 lbs/hr. In some embodiments, using these or other parameters, fiber webs having relatively low surface densities of particles can be formed as described in more detail below.

In some embodiments, varying the above-noted parameters during an extrusion process, and/or using one or more additives described herein, may result in essentially none or relatively low amounts of polymer degradation during fiber formation. In some cases, such processes can be used to form fine fibers, such as ones having a diameter in one of the ranges described herein (e.g., an average diameter between about 0.1 and about 1.5 microns, or between about 0.1 and about 0.6 microns). Without wishing to be bound by any theory, the inventors believe that subjecting the polymer material used to form the fibers to relatively high temperatures and pressures for extended periods of time in an extrusion system can cause the polymeric material to degrade. Degradation may involve chain scission, i.e., shortening of the polymer chains to produce lower molecular weight polymers, and/or other forms of decomposition (e.g., chemical decomposition, thermal decomposition, ionization). As a result of polymer degradation, small polymeric particles may be formed. These particles may have the same chemical composition as the polymeric material used to form the fibers (but having a lower molecular weight), or may be a derivative of the polymeric material used to form the fibers. The particles may be associated with the fiber web in various configurations. For instance, the particles may reside on the surface of the fibers, on the surface of the fiber web, in the center of the fiber web, or in combinations thereof. As noted above, as the amount of degraded polymer increases, less fiber is produced per unit of polymer. For fiber webs used for filtration, for example, this occurrence is not desirable as it may result in increased basis weight in order to achieve the same level of performance as fiber webs without degraded polymer, all other factors being equal.

The shape and size of the polymeric particles formed may vary, and in some cases, the particles can even agglomerate to form larger particles. It should be understood that the polymeric particles described herein are different from fibers. The polymeric particles are non-fibrous, and generally have an aspect ratio (i.e., a length to largest cross-sectional dimension) of less than 50:1 and a largest cross-sectional dimension of at least 0.2 mm. In some embodiments, a particle may have a largest cross-sectional dimension of about 0.2 mm or greater, about 0.5 mm or greater, about 1.0 mm or greater, about 1.5 mm or greater, about 2.0 mm or greater, about 2.5 mm or greater, about 3.0 mm or greater, about 3.5 mm or greater, about 4.0 mm or greater, about 4.5 mm or greater, about 5.0 mm or greater, about 5.5 mm or greater, about 6.0 mm or greater, about 6.5 mm or greater, about 7.0 mm or greater, about 7.5 mm or greater, about 8.0 mm or greater, about 8.5 mm or greater, about 9.0 mm or greater, about 9.5 mm or greater, or about 10.0 mm or greater. Other values and ranges of particle size are also possible.

In certain embodiments, the average molecular weight of the particles formed during a fiber extrusion process may be less than about ½ the average molecular weight of the polymer used to form the fibers. For instance, the average molecular weight of the particles formed during a fiber extrusion process may be less than about ⅛, less than about 1/64, or less than about 1/200 the average molecular weight of the polymer used to form the fibers. Other values of molecular weight of the particles associated with a fiber web are also possible.

In some embodiments, a fiber web described herein may include a relatively low number of or essentially no particles on its surface. The amount of particles may be measured by determining the surface density of particles on the fiber web, i.e., the number of particles on a surface of the fiber web per unit area of the fiber web surface. For instance, a fiber web may have a surface density of particles of less than about 12.0 particles/inch$^2$, less than about 11.5 particles/inch$^2$, less than about 11.0 particles/inch$^2$, less than about 10.5 particles/inch$^2$, less than about 10.0 particles/inch$^2$, less than about 9.5 particles/inch$^2$, less than about 9.0 particles/inch$^2$, less than about 8.5 particles/inch$^2$, less than about 8.0 particles/inch$^2$, less than about 7.5 particles/inch$^2$, less than about 7.0 particles/inch$^2$, less than about 6.5 particles/inch$^2$, less than about 6.0 particles/inch$^2$, less than about 5.5 particles/inch$^2$, less than about 5.0 particles/inch$^2$, less than about 4.5 particles/inch$^2$, less than about 4.0 particles/inch$^2$, less than about 3.5 particles/inch$^2$, less than about 3.0 particles/inch$^2$, less than about 2.7 particles/inch$^2$, less than about 2.5 particles/inch$^2$, less than about 2.2 particles/inch$^2$, less than about 2.0 particles/inch$^2$, less than about 1.8 particles/inch$^2$, less than about 1.6 particles/inch$^2$, less than about 1.5 particles/inch$^2$, less than about 1.3 particles/inch$^2$, less than about 1.0 particles/inch$^2$, less than about 0.8 particles/inch$^2$, less than about 0.5 particles/inch$^2$, or less than about 0.3 particles/inch$^2$, wherein each of the particles has a largest cross-sectional dimension of one of the ranges or values described above. For example, in one particular embodiment, a fiber web has a surface density of particles of less than about 3.0 particles/inch$^2$, wherein each of the particles has a largest cross-sectional dimension of between about 0.2 mm or greater. In this embodiment, even though the fiber web may include some particles having a largest cross-sectional dimension smaller than about 0.2 mm, these particles are not accounted for in calculating the surface density of particles. In another embodiment, a fiber web has a surface density of particles of less than about 3.0 particles/inch$^2$, wherein each of the particles has a largest cross-sectional dimension of about 1.0 mm or greater. In this embodiment, even though the fiber web may include some particles having a largest cross-sectional dimension smaller than about 1.0 mm, these particles are not accounted for in calculating the surface density of particles. Other surface densities of particles in a particular size range or value are also possible.

The number of particles per area of fiber web can be determined as follows. A sample of fiber web can be layered together with carbon paper and a white sheet of standard copy paper, where the carbon paper is positioned between the fiber web and the copy paper. The composite structure can be placed in a continuous belt press where the following conditions are employed: a line speed of 2.5 m/min, a pressure of 6 bar, and a temperature of about 68° F.-80° F. (room temperature). After exposure to these conditions, the degraded polymer particles, if present, may lie at an elevated position compared to the fibers, and appear as small "dots" on the underlying copy paper. If a darker image is needed for detection, the copy paper can be photocopied with a standard copier to darken the carbon image. This copy paper image can be scanned using standard imaging software, and software (e.g., ImageJ software available for download at http://rsweb.nih.gov/ij/) can be used to determine the number of "dots" on the image. These "dots" may be measured in pixels, and each pixel can be correlated to a certain size to determine the size and number of particles. For instance, 1 pixel may correspond to 0.2646 mm, so a "dot" having a size of 1 pixel on the image may correspond to 1 particle having a largest dimension of 0.2646 mm; a "dot" having a size of 4 pixels on the image may correspond to 1 particle having a largest dimension of 1.1 mm. Pixel sizes may vary depending on the imaging hardware and/or software used. To calculate a surface density of particles, wherein each of the particles has a largest cross-sectional dimension of, for example, about 1.0 mm or greater, only the "dots" having a size of at least 4 pixels (e.g., a largest cross-sectional dimension of about 1.0 mm or greater) would be counted. This number would be divided by the area of the fiber web used for counting the particles to determine the surface density of particles. In this particular instance, even though the fiber web may include some particles having a largest cross-sectional dimension smaller than about 1.0 mm, these particles are not accounted for for the purpose of this particular calculation.

In some embodiments, fiber webs having a value or range of surface density of particles described above can also have one or more of the values and ranges of the features and performance characteristics described below.

A fiber web described herein may be formed of fibers having an average diameter between about 0.1 microns and about 1.5 microns. For instance, the fiber web may include fibers (e.g., meltblown fibers) having an average diameter of between about 0.1 microns and about 1.3 microns, between about 0.1 microns and about 1.2 microns, between about 0.1 microns and about 1.0 microns, between about 0.25 microns and about 1.0 microns, between about 0.1 microns and about 0.8 microns, between about 0.1 microns and about 0.7 microns, between about 0.1 microns and about 0.6 microns, between about 0.1 microns and about 0.5 microns, or between about 0.1 microns and about 0.4 microns. In some embodiments, the average diameter of the fibers (e.g., meltblown fibers) in a fiber web may be about 1.5 microns or less, about 1.4 microns or less, about 1.3 microns or less, about 1.2 microns or less, about 1.1 microns or less, about 1.0 microns or less, about 0.9 microns or less, about 0.8 microns or less, about 0.7 microns or less, about 0.6 microns or less, about 0.5 microns or less, about 0.4 microns or less, or about 0.3 microns or less. In other embodiments, the average diameter of the fibers (e.g., meltblown fibers) in a fiber web may be greater than about 0.2 microns, greater than about 0.4 microns, greater than about 0.6 microns, greater than about 0.8 microns, greater than about 1.0 microns, or greater than about 1.2 microns. As used herein, fiber diameter is measured using scanning electron microscopy.

The fiber web can generally have any suitable thickness. In some embodiments, the fiber web has a thickness between about 0.0005 inches and about 0.040 inches. For instance, the thickness of the fiber web may be between about 0.001 inches and about 0.030 inches, between about 0.001 inches and about 0.020 inches, between about 0.002 inches and about 0.02 inches, between about 0.006 inches and about 0.016 inches, between about 0.002 inches and about 0.010 inches, or between about 0.002 inches and about 0.020 inches. In some instances, the thickness of the fiber web may be less than or equal to about 0.040 inches, less than or equal to about 0.030 inches, less than or equal to about 0.025 inches, less than or equal to about 0.020 inches, less than or equal to about 0.018 inches, less than or equal to about 0.016 inches, less than or equal to about 0.015 inches, less than or equal to about 0.012 inches, less than or equal to about 0.010 inches, less than or equal to about 0.0070 inches, less than or equal to about 0.0060 inches, less than or equal to about 0.0050 inches, less than or equal to about 0.0040 inches, or less than or equal to about 0.0020 inches. In some instances, the thickness of the fiber web may be greater than about 0.0010 inches, greater than about 0.0020 inches, greater than about 0.0030 inches, greater than about 0.0040 inches, greater than about 0.0050 inches, greater than about 0.0060 inches, greater than about 0.0070 inches, greater than about 0.010 inches, greater than about 0.015 inches, greater than about 0.020 inches, or greater than about 0.030 inches. Combinations of the above-referenced ranges are also possible (e.g., a thickness of less than or equal to about 0.016 inches and greater than about 0.0060 inches). Other ranges are also possible. As referred to herein, thickness is determined according to the standard ASTM D1777.

In certain embodiments, the fiber webs described herein have a relatively high consistency (low variability) of thickness across the fiber web. For instance, the variability of thickness across the fiber web may be about 6.0 standard deviations or less, about 5.5 standard deviations or less, about 5.0 standard deviations or less, about 4.5 standard deviations or less, about 4.0 standard deviations or less, about 3.5 standard deviations or less, about 3.0 standard deviations or less, about 2.5 standard deviations or less, about 2.0 standard deviations or less, about 1.5 standard deviations or less, about 1.0 standard deviations or less, or about 0.5 standard deviations or less. Other values of thickness variability are also possible. The variability of thickness may be determined by taking a statistically significant number of measurements across the fiber web.

The basis weight of the fiber web can typically be selected as desired. In some embodiments, the basis weight of the fiber web may be between about 1.0 $g/m^2$ and about 200 $g/m^2$ (e.g., between about 1.0 $g/m^2$ and about 100 $g/m^2$, between about 15 $g/m^2$ and about 200 $g/m^2$, or between about 30 $g/m^2$ and about 200 $g/m^2$). For instance, the basis weight of the fiber web may be between about 1.0 $g/m^2$ and about 70 $g/m^2$, between about 1.0 $g/m^2$ and about 50 $g/m^2$, between about 3.0 $g/m^2$ and about 30 $g/m^2$, or between about 3.0 $g/m^2$ and about 20 $g/m^2$. In some embodiments, the basis weight of the fiber web is greater than about 1 $g/m^2$ (e.g., greater than about 10 $g/m^2$, greater than about 15 $g/m^2$, greater than about 25 $g/m^2$, greater than about 30 $g/m^2$, greater than about 50 $g/m^2$, greater than about 75 $g/m^2$, greater than about 100 $g/m^2$, greater than about 125 $g/m^2$, greater than about 150 $g/m^2$, greater than about 175 $g/m^2$, or greater than about 200 $g/m^2$), and/or less than about 400 (e.g., less than about 175 $g/m^2$, less than about 150 $g/m^2$, less than about 125 $g/m^2$, less than about 100 $g/m^2$, less than about 90 $g/m^2$, less than about 75 $g/m^2$, less than about 50 g/m², less than about 25 g/m², or less than about 15 g/m²). Combinations of the above-referenced ranges are also possible (e.g., a basis weight of less than about 200 g/m² and greater than about 30 g/m²). Other ranges are also possible. As referred to herein, basis weight is determined according to ASTM D3776.

In certain embodiments, the fiber webs described herein have a relatively high consistency (low variability) of basis weight across the fiber web. For instance, the variability of basis weight across the fiber web may be about 6.0 standard deviations or less, about 5.5 standard deviations or less, about 5.0 standard deviations or less, about 4.5 standard deviations or less, about 4.0 standard deviations or less, about 3.5 standard deviations or less, about 3.0 standard deviations or less, about 2.5 standard deviations or less, about 2.0 standard deviations or less, about 1.5 standard deviations or less, about 1.0 standard deviations or less, or about 0.5 standard deviations or less. Other values of basis weight variability are also possible. The variability of basis weight may be determined by taking a statistically significant number of measurements across the fiber web.

In some embodiments, a fiber web can include multiple layers (e.g., at least 2, 3, 4, 5, 6, 7, 8, 9, 10, 12, 14, 16, 18, or 20 layers). In some cases, two or more layers of the same composition (e.g., having the same fiber type, fiber size, etc.) may be stacked together to form a thicker fiber web having a relatively homogeneous composition across the thickness of the web. In other cases, two or more layers of different compositions can be stacked together to form a composite having different properties across the thickness of the web. Stacked layers may optionally be adhered to one another using any suitable method such as lamination and calendering.

Lamination may involve, for example, compressing two or more layers together using a flatbed laminator or any other suitable device at a particular pressure and temperature for a certain residence time (i.e., the amount of time spent under pressure and heat). For instance, the pressure may be between about 30 psi to about 150 psi (e.g., between about 30 psi to about 90 psi, between about 60 psi to about 120 psi, between about 30 and 60 psi, or between about 120 psi and about 90 psi); the temperature may be between about 75° F. and about 400° F. (e.g., between about 75° F. and about 300° F., between about 200° F. and about 350° F., or between about 275° F. and about 390° F.); and the residence time between about 1 second to about 60 seconds (e.g., between about 1 second to about 30 seconds, between about 10 second to about 25 seconds, or between about 20 seconds and about 40 seconds). Other ranges for pressure, temperature and residence time are also possible.

Calendering may involve, for example, compressing two or more layers together using calendar rolls under a particular linear pressure, temperature, and line speed. For instance, the linear pressure may be between about 50 lb/inch and about 400 lb/inch (e.g., between about 200 lb/inch and about 400 lb/inch, between about 50 lb/inch and about 200 lb/inch, or between about 75 lb/inch and about 300 lb/inch); the temperature may be between about 75° F. and about 400° F. (e.g., between about 75° F. and about 300° F., between about 200° F. and about 350° F., or between about 275° F. and about 390° F.); and the line speed may be between about 5 ft/min to about 100 ft/min (e.g., between about 5 ft/min to about 80 ft/min, between about 10 ft/min to about 50 ft/min, between about 15 ft/min to about 100 ft/min, or between about 20 ft/min to about 90 ft/min). Other ranges for linear pressure, temperature and line speed are also possible.

In certain embodiments, the fiber webs described herein may have a relatively high surface area. In certain embodiments, a fiber web may have a surface area between about 0.1 m²/g and about 6.0 m²/g. For instance, a fiber web may have a surface area between about 0.1 m²/g and about 6.0 m²/g, between about 0.5 m²/g and about 6.0 m²/g, between about 1.0 m²/g and about 6.0 m²/g, between about 1.3 m²/g and about 6.0 m²/g, between about 1.5 m²/g and about 6.0 m²/g, between about 1.7 m²/g and about 6.0 m²/g, between about 1.8 m²/g and about 6.0 m²/g, between about 2.0 m²/g and about 6.0 m²/g, or between about 2.5 m²/g and about 6.0 m²/g. In some cases, a fiber web has a surface area of about 1.0 m²/g or greater, about 1.3 m²/g or greater, 1.5 m²/g or greater, about 1.6 m²/g or greater, about 1.7 m²/g or greater, about 1.8 m²/g or greater, about 1.9 m²/g or greater, about 2.0 m²/g or greater, about 2.1 m²/g or greater, 2.2 m²/g or greater, about 2.3 m²/g or greater, about 2.4 m²/g or greater, about 2.5 m²/g or greater, about 2.6 m²/g or greater, about 2.7 m²/g or greater, about 2.8 m²/g or greater, 2.9 m²/g or greater, or about 3.0 m²/g or greater. As determined herein, surface area is measured through use of a standard BET surface area measurement technique. The BET surface area is measured according to section 10 of Battery Council International Standard BCIS-03A, "Recommended Battery Materials Specifications Valve Regulated Recombinant Batteries", section 10 being "Standard Test Method for Surface Area of Recombinant Battery Separator Mat". Following this technique, the BET surface area is measured via adsorption analysis using a BET surface analyzer (e.g., Micromeritics Gemini III 2375 Surface Area Analyzer) with nitrogen gas; the sample amount is between 0.5 and 0.6 grams in a ¾" tube; and, the sample is allowed to degas at 75 degrees C. for a minimum of 3 hours.

The mean pore size (mean flow pore) of the fiber web may also vary. In some embodiments, a fiber web has a mean pore size between about 1 micron and about 30 microns. For instance, the mean pore size may be between about 0.1 microns and about 10 microns, between about 0.1 microns and about 3 microns, between about 0.1 microns and about 1 micron, between about 1 micron and about 20 microns, between about 1 micron and about 15 microns, between about 5 microns and about 15 microns, between about 1 micron and about 10 microns, or between about 5 microns and about 15 microns. In certain embodiments, the mean pore size may be less than or equal to about 30 microns, less than or equal to about 25 microns, less than or equal to about 20 microns, less than or equal to about 15 microns, less than or equal to about 10 microns, less than or equal to about 6 microns, less than or equal to about 5 microns, less than or equal to about 3 microns, less than or equal to about 2.5 microns, less than or equal to about 2 microns, less than or equal to about 1.5 microns, less than or equal to about 1.0 micron, less than or equal to about 0.8 microns, less than or equal to about 0.6 microns, less than or equal to about 0.5 microns, less than or equal to about 0.4 microns, less than or equal to about 0.3 microns, or less than or equal to about 0.2 microns. In other embodiments, the mean pore size may be greater than about 0.1 microns, greater than about 0.2 microns, greater than about 0.3 microns, greater than about 0.35 microns, greater than about 0.4 microns, greater than about 0.5 microns, greater than about 0.6 microns, greater than about 0.8 microns, greater than about 1 micron, greater than about 2 microns, greater than about 3 microns, greater than about 5 microns, greater than about 10 microns, greater than about 15 microns, greater than about 20 microns, greater than about 25 microns, or greater than about 30 microns. Combinations of the above-referenced ranges are also possible (e.g., a mean pore size of less than or equal to about 1.0 micron and greater than about 0.3 microns). Other values and ranges of mean pore size are also possible. As used herein, mean pore size is measured according to the standard ASTM F-316-80 Method B, BS6410, e.g., using a Capillary Flow Porometer made by Porous Materials, Inc.

In some embodiments, a bubble point of a fiber web may be measured. The bubble point refers to the largest pore size within the fiber web. In some embodiments, a fiber web has a bubble point of between about 0.1 micron and about 30 microns. For instance, the bubble point may be between about 0.1 microns and about 10 microns, between about 0.1 microns and about 3 microns, between about 0.1 microns and about 1 micron, between about 1 micron and about 20 microns, between about 1 micron and about 15 microns, between about 1.2 microns and about 7 microns, between about 1 micron and about 10 microns, or between about 5 microns and about 15 microns. In certain embodiments, the bubble point may be less than or equal to about 30 microns, less than or equal to about 25 microns, less than or equal to about 20 microns, less than or equal to about 15 microns, less than or equal to about 10 microns, less than or equal to about 7 microns, less than or equal to about 6 microns, less than or equal to about 5 microns, less than or equal to about 3 microns, less than or equal to about 2.5 microns, less than or equal to about 2 microns, less than or equal to about 1.5 microns, less than or equal to about 1.0 micron, less than or equal to about 0.8 microns, less than or equal to about 0.6 microns, less than or equal to about 0.5 microns, less than or equal to about 0.4 microns, less than or equal to about 0.3 microns, or less than or equal to about 0.2 microns. In other embodiments, the bubble point may be greater than about 0.1 microns, greater than about 0.2 microns, greater than about 0.3 microns, greater than about 0.35 microns, greater than about 0.4 microns, greater than about 0.5 microns, greater than about 0.6 microns, greater than about 0.8 microns, greater than about 1 micron, greater than about 2 microns, greater than about 3 microns, greater than about 5 microns, greater than about 10 microns, greater than about 15 microns, greater than about 20 microns, greater than about 25 microns, or greater than about 30 microns. Combinations of the above-referenced ranges are also possible (e.g., a bubble point of less than or equal to about 1.0 micron and greater than about 0.3 microns). Other values and ranges of bubble point are also possible. As used herein, bubble point is measured according to the standard ASTM F-316-80 Method B, BS6410 e.g., using a Capillary Flow Porometer made by Porous Materials Inc.

In some embodiments, the fiber webs described herein have a certain ratio of bubble point to mean pore size. In some embodiments, the ratio of bubble point to mean pore size is less than or equal to about 10:1, less than or equal to about 8:1, less than or equal to about 6:1, less than or equal to about 5:1, less than or equal to about 4:1, less than or equal to about 3:1, less than or equal to about 2.5:1, less than or equal to about 2:1, or less than or equal to about 1.5:1, In certain embodiments, the ratio of bubble point to mean pore size is greater than or equal to about 1:1, greater than or equal to about 1.5:1, greater than or equal to about 2:1, greater than or equal to about 2.5:1, greater than or equal to about 3:1, greater than or equal to about 4:1, greater than or equal to about 5:1, greater than or equal to about 6:1, greater than or equal to about 8:1, or greater than or equal to about 10:1. Combinations of the above-referenced ranges are also possible (e.g., a ratio of greater than about 1:1 and less than or equal to about 3:1). Other ranges are also possible.

In some embodiments, the solidity of the fiber web may be measured. The solidity is the volume fraction of media occupied by the solids (e.g., fibers) and is therefore the ratio of the solids volume per unit mass divided by the media's volume per unit mass. The solidity can be derived from the fiber web porosity based on the following equation solidity (%)=1−porosity (%). In some embodiments, the solidity of a fiber web described herein may range between about 5% and about 70%. For instance, the solidity may be greater than or equal to about 5%, greater than or equal to about 10%, greater than or equal to about 20%, greater than or equal to about 25%, greater than or equal to about 30%, greater than or equal to about 40%, greater than or equal to about 50%, greater than or equal to about 60%, or greater than or equal to about 70%. In some embodiments, the solidity of the fiber web may be less than about 70%, less than about 60%, less than about 55%, less than about 50%, less than about 40%, less than about 30%, less than about 20%, or less than about 10%. Combinations of the above-referenced ranges are also possible (e.g., a solidity of greater than or equal to about 25% and less than about 55%). Other values and ranges of solidity are also possible. As used herein, solidity is expressed by the following formula: basis weight/(bulk fiber density×thickness).

Typically, the fiber web is formed of one or more polymers. Exemplary polymers include polyolefins (e.g., polypropylenes), polyesters (e.g., polybutylene terephthalate, polybutylene naphthalate), polyamides (e.g., nylons), polycarbonates, polyphenylene sulfides, polystyrenes, polyurethanes (e.g., thermoplastic polyurethanes). Optionally, the polymer(s) may contain fluorine atoms. Examples of such polymers include PVDF and PTFE. Examples of specific polymers that may be used include a polypropylene manufactured by LyondellBasell (MF650Y), a polypropylene manufactured by Total Petrochemicals (3962), a polypropylene manufactured by Exxon (PP3546G and ACHV6936G1 Metocene PP), a polypropylene manufactured by *Borealis* (HL512FB), a polyester (PBT) manufactured by Ticona (HB85151M1 CX2008) and a nylon manufactured by BASF (Ultramid B3SQ661). Other polymers suitable for use in an extrusion process can also be used.

In some embodiments, the fiber web includes one or more additives such as a binder, a lubricant, a slip agent, a surfactant, a coupling agent, a crosslinking agent, amongst others. In certain instances, one or more additives can be used to reduce or eliminate the number of polymeric particles formed on or in a fiber web.

Generally, the fiber web includes a small weight percentage of an additive. For example, the fiber web may include less than about 10%, less than about 8%, less than about 6%, less than about 5%, or less than about 4% of an additive. In some cases, the fiber web may include between about 1% and about 10%, between about 1% and about 8%, between about 1% and about 5% of an additive, or between about 1% and about 2.5% of an additive. In certain embodiments, the fiber web may include less than about 5%, less than about 3%, less than about 2%, or less than about 1% of a fatty acid additive as described below. In some embodiments, the additive may be added to the polymer material used to form the fibers when the polymeric material is in a molten (e.g., melted) state. In other embodiments, the additive coats the fibers after the fibers have been formed.

In some embodiments, a fiber web may include an additive (e.g., a slip agent or other type of additive) in the form of a lipid. In some cases, the additive comprises a fatty acid (e.g., a saturated fatty acid, an unsaturated fatty acid, a mono-unsaturated fatty acid, a poly-unsaturated fatty acid).

In certain embodiments, the fatty acid includes an amide group (e.g., a fatty acid amide). Non-limiting examples of fatty acid amides include stearamide, behenamide, erucamide, N-(2-hdriethyl) erucamide, lauramide, N,N'-ethylene-bis-oleamide, N,N'-ethylene bissteamide, oleamide, oleyl palmitamide, stearyl erucamide, tallow amide, arachidonylethanolamide, N-arachidonylmaleimide, mixtures thereof, and derivatives thereof.

Examples of specific additives that may be used include an additive provided by Standridge Color Corp., having a supplier part no.: 22686, and an additive containing provided by Standridge Color Corp., having a supplier part no. 10SAM1044.

In certain embodiments, the additive is in the form of a fatty acid having a $C_n$ (carbon) chain, where n is an integer. In some cases, n is 2 or greater, 4 or greater, 6 or greater, 8 or greater, 10 or greater, 12 or greater, 14 or greater, 16 or greater, 18 or greater, 20 or greater, 22 or greater, 24 or greater, 26 or greater, 28 or greater, 30 or greater, 32 or greater, 34 or greater, 36 or greater, 38 or greater, or 40 or greater. In other cases, n is less than or equal to 50, less than or equal to 45, less than or equal to 40, less than or equal to 35, less than or equal to 40, less than or equal to 35, less than or equal to 30, less than or equal to 25, less than or equal to 20, less than or equal to 15, less than or equal to 10, or less than or equal to 5.

The fiber webs described herein may have various performance characteristics. In some cases, the fiber webs have performance characteristics that enable them to be suitable for use as filter media.

In some embodiments, methods described herein for forming meltblown fibers can result in a fiber web having a relatively low air permeability. For instance, the air permeability of a fiber web may be less than about 1,800 ft³/min/ft² (CFM), less than about 1,500 CFM, less than about 1,300 CFM, less than about 1,000 CFM, less than about 900 CFM, less than about 800 CFM, less than about 750 CFM, less than about 700 CFM, less than about 600 CFM, less than about 500 CFM, less than about 400 CFM, less than about 300 CFM, less than about 200 CFM, less than about 100 CFM, less than about 50 CFM, less than about 45 CFM, less than about 40 CFM, less than about 35 CFM, less than about 30 CFM, less than about 25 CFM, less than about 20 CFM, less than about 15 CFM, less than about 10 CFM, or less than about 5 CFM. In some embodiments, the air permeability may be greater than about 1 CFM, greater than about 2 CFM, greater than about 5 CFM, greater than about 10 CFM, greater than about 15 CFM, greater than about 20 CFM, greater than about 25 CFM, greater than about 30 CFM, greater than about 40 CFM, greater than about 50 CFM, greater than about 75 CFM, greater than about 100 CFM, greater than about 200 CFM, greater than about 500 CFM, greater than about 1,000 CFM, greater than about 1,300 CFM, or greater than about 1,500 CFM). In general, the air permeability of the fiber web can vary between about 2 CFM and about 1800 CFM (e.g., between about 10 CFM and about 1800 CFM, between about 10 CFM and about 1,500 CFM, between about 10 CFM and about 1,000 CFM, between about 10 CFM and about 750 CFM, between about 40 CFM and about 750 CFM, between about 10 CFM and about 600 CFM, between about 10 CFM and about 500 CFM, between about 10 CFM and about 400 CFM, between about 10 CFM and about 300 CFM, between about 10 CFM and about 200 CFM, between about 10 CFM and about 100 CFM, or between about 10 CFM and about 50 CFM). Combinations of the above-referenced ranges are also possible (e.g., an air permeability of greater than about 2 CFM and less than about 35 CFM). Other ranges are also possible. As used herein, air permeability is measured according to the standard ASTM D737-75. The air permeability may be measured at a pressure of 12.5 mm $H_2O$ (e.g., for relatively low permeability measurements) or at a pressure of 250 mm $H_2O$ (e.g., for relatively high permeability measurements). Unless otherwise indicated, the values described herein for air permeability are measured at a pressure of 250 mm $H_2O$.

The fiber webs described herein may have different ranges of NaCl particle filtration efficiencies. The NaCl particle filtration efficiency is $[1-(C/C_0)]*100\%$, where C is the NaCl particle concentration after passage through the fiber web and $C_0$ is the NaCl particle concentration before passage through the filter. To measure NaCl particle filtration efficiency, a 100 cm² surface area of the fiber web can be tested with NaCl (sodium chloride) particles having a 0.26 micron mass mean diameter with a geometric standard deviation less than 1.83, a concentration of 15 to 20 mg/cm³, and a face velocity of 5.3 cm/s by a TSI 8130 CertiTest™ automated filter testing unit from TSI, Inc. equipped with a sodium chloride generator. The instrument measures a pressure drop (e.g., an airflow resistance) across the fiber web and the resultant penetration value on an instantaneous basis at a flow rate less than or equal to 115 liters per minute (lpm). Instantaneous readings can be defined as 1 pressure drop/penetration measurement. This test is described in ASTM D2 986-91.

A fiber web described herein may have a NaCl particle filtration efficiency between about 0.0001% and about 99.97%. For instance, the NaCl particle filtration efficiency may be between about 0.001% and about 99.97%, between about 0.01% and about 99.97%, between about 0.1% and about 99.97%, between about 1% and about 99.97%, between about 10.0% and about 99.97%, between about 40.0% and about 99.97%, between about 60.0% and about 99.97%, or between about 85.0% and about 99.97%. In some cases, the NaCl particle filtration efficiency is greater than about 10.0%, greater than about 20.0%, greater than about 30.0%, greater than about 40.0%, greater than about 50.0%, greater than about 60.0%, greater than about 70.0%, greater than about 80.0%, greater than about 90.0%, greater than about 95.0%, greater than about 97.0%, greater than about 98.0%, greater than about 99.0%, greater than about 99.5%, greater than about 99.9%, or greater than about 99.97%. Other ranges and values of NaCl particle filtration efficiency are also possible.

In some cases, a fiber web described herein may have an airflow resistance between about 0.1 mm $H_2O$ and about 50.0 mm $H_2O$. For instance, the air flow resistance may be between about 0.1 mm $H_2O$ and about 40.0 mm $H_2O$, between about 0.1 mm $H_2O$ and about 30.0 mm $H_2O$, between about 0.1 mm $H_2O$ and about 20.0 mm $H_2O$, between about 0.1 mm $H_2O$ and about 10.0 mm $H_2O$, between about 0.3 mm $H_2O$ and about 5.0 mm $H_2O$, between about 0.3 mm $H_2O$ and about 3.5 mm $H_2O$, between about 0.3 mm $H_2O$ and about 3.0 mm $H_2O$, between about 0.1 mm $H_2O$ and about 2.5 mm $H_2O$, or between about 0.1 mm $H_2O$ and about 2.0 mm $H_2O$. In some cases, the air flow resistance of a fiber web is less than about 50.0 mm $H_2O$, less than about 40.0 mm $H_2O$, less than about 30.0 mm $H_2O$, less than about 20.0 mm $H_2O$, less than about 10.0 mm $H_2O$, less than about 5.0 mm $H_2O$, or less than about 2.5 mm $H_2O$. In other cases, the air flow resistance of a fiber web is greater than about 1.0 mm $H_2O$, greater than about 2.5 mm $H_2O$, greater than about 5.0 mm $H_2O$, greater than about 10.0 mm $H_2O$, greater than about 20.0 mm $H_2O$, greater than about 30.0 mm $H_2O$, or greater than about 40.0 mm H$_2$O, Other ranges and values of air flow resistance are also possible. As used herein, air flow resistance is measured according to the standard ASTM D2 986-91 as described above.

In some embodiments, a fiber web described herein may have good liquid performance as measured in deionized water (e.g., water flux, water permeability) and in an aqueous silica dispersion (e.g., permeate turbidity, initial permeate flux and/or final permeate flux in the silica dispersion). Permeate refers to any amount of filtered water that passes through a media.

As used herein, water flow rate is measured by passing deionized water through a fiber web at a pressure of 20 psi until 1,000 ml of permeate has been collected. The flow rate is determined when 1,000 ml of permeate has been collected. Water flux is calculated by dividing the flow rate (ml/min) by a sample effective area (cm$^2$) of the fiber web (i.e., the area exposed to fluid flow) and is expressed in ml/min·cm$^2$. In some embodiments, a fiber web described herein may have a water flux of between about 5 ml/min·cm$^2$ and about 200 ml/min·cm$^2$. For example, the water flux may be greater than or equal to about 5 ml/min·cm$^2$, greater than or equal to about 10 ml/min·cm$^2$, greater than or equal to about 20 ml/min·cm$^2$, greater than or equal to about 30 ml/min·cm$^2$, greater than or equal to about 40 ml/min·cm$^2$, greater than or equal to about 50 ml/min·cm$^2$, greater than or equal to about 60 ml/min·cm$^2$, greater than or equal to about 70 ml/min·cm$^2$, greater than or equal to about 80 ml/min·cm$^2$, greater than or equal to about 90 ml/min·cm$^2$, greater than or equal to about 100 ml/min·cm$^2$, greater than or equal to about 125 ml/min·cm$^2$, greater than or equal to about 150 ml/min·cm$^2$, or greater than or equal to about 175 ml/min·cm$^2$. In some embodiments, the fiber web may have a water flux of less than about 200 ml/min·cm$^2$, less than about 175 ml/min·cm$^2$, less than about 150 ml/min·cm$^2$, less than about 125 ml/min·cm$^2$, less than about 100 ml/min·cm$^2$, less than about 90 ml/min·cm$^2$, less than about 80 ml/min·cm$^2$, less than about 70 ml/min·cm$^2$, less than about 60 ml/min·cm$^2$, less than about 50 ml/min·cm$^2$, less than about 40 ml/min·cm$^2$, less than about 30 ml/min·cm$^2$, less than about 20 ml/min·cm$^2$, or less than about 10 ml/min·cm$^2$. Combinations of the above-referenced ranges are possible (e.g., a water flux of greater than about 10 ml/min·cm$^2$ and less than about 60 ml/min·cm$^2$). Other ranges are also possible.

Water permeability is determined by dividing the water flux by the applied pressure for determining flow rate (e.g., 20 psi), and is expressed as ml/min·cm$^2$·psi. In some embodiments, a fiber web described herein may have a water of between about 0.1 ml/min·cm$^2$·psi and about 10.0 ml/min·cm$^2$·psi. For example, the water permeability may be greater than or equal to about 0.1 ml/min·cm$^2$·psi, greater than or equal to about 0.2 ml/min·cm$^2$·psi, greater than or equal to about 0.5 ml/min·cm$^2$·psi, greater than or equal to about 1.0 ml/min·cm$^2$·psi, greater than or equal to about 2.0 ml/min·cm$^2$·psi, greater than or equal to about 3.0 ml/min·cm$^2$·psi, greater than or equal to about 5.0 ml/min·cm$^2$·psi, greater than or equal to about 7.0 ml/min·cm$^2$·psi, or greater than or equal to about 10.0 ml/min·cm$^2$·psi. In some embodiments, the water permeability may be less than or equal to about 10.0 ml/min·cm$^2$·psi, less than or equal to about 7.0 ml/min·cm$^2$·psi, less than or equal to about 6.0 ml/min·cm$^2$·psi, less than or equal to about 4.0 ml/min·cm$^2$·psi, less than or equal to about 2.0 ml/min·cm$^2$·psi, less than or equal to about 1.0 ml/min·cm$^2$·psi, or less than or equal to about 0.5 ml/min·cm$^2$·psi. Combinations of the above-referenced ranges are also possible (e.g., a water permeability of greater than or equal to 0.5 ml/min·cm$^2$·psi and less than about 3.0 ml/min·cm$^2$·psi) Other ranges are also possible.

In some embodiments, an initial permeate flux can be measured. As used herein, initial permeate flux is determined by passing an aqueous silica suspension through a fiber web at a pressure of 30 psi until 50 ml of permeate has been collected. The initial permeate flux is calculated by dividing the flow rate (ml/min) of the suspension by a sample effective area (cm$^2$) of the fiber web (i.e., the area exposed to fluid flow) and is expressed in ml/min·cm$^2$. The flow rate is determined when 50 ml of permeate has been collected.

In some embodiments, a final permeate flux can be measured. Final permeate flux is determined by passing the aqueous silica suspension through the fiber web at a pressure of 30 psi until 500 ml of permeate has been collected. The final permeate flux is calculated by dividing the flow rate (ml/min) of the suspension by a sample effective area (cm$^2$) of the fiber web (i.e., the area exposed to fluid flow) and is expressed in ml/min·cm$^2$. The flow rate is determined when 500 ml of permeate has been collected.

Under such testing conditions for initial permeate flux and final permeate flux, the flux gradually decreases until the filtration process is stopped after 50 ml (initial permeate flux) or 500 ml (final permeate flux) of the aqueous silica dispersion has passed through the filter. The occurrence of flux decrease—or "flux decline" (a measure of the decrease in flux from an initial permeate flux to a final permeate flux)—reflects a gradual clogging of the filter medium by silica particles. The initial flux reflects the filtration performance of a filter when clogging is limited (collected permeate is only 50 ml) and its value can sometimes match that of deionized water flux. The final flux reflects the filtration performance of the filter when a cake is formed and the retention mechanism is controlled by both the fiber web and the clogging layer.

The aqueous silica suspension used for determining initial permeate flux and final permeate flux is prepared by dispersing ISO 12103-1-A2 silica fine test dust (e.g., manufactured by Powder Technology) in deionized water at a concentration of 1,500 ppm. ISO 12103-1-A2 silica fine test dust has an estimated mean particle size of 8.7 microns, and the full particle size distribution ranges from between about 0.7 microns to about 84 microns.

In some embodiments, a fiber web described herein may have an initial permeate flux of between about 5 ml/min·cm$^2$ and about 200 ml/min·cm$^2$. For example, the initial permeate flux may be greater than or equal to about 5 ml/min·cm$^2$, greater than or equal to about 10 ml/min·cm$^2$, greater than or equal to about 20 ml/min·cm$^2$, greater than or equal to about 30 ml/min·cm$^2$, greater than or equal to about 40 ml/min·cm$^2$, greater than or equal to about 50 ml/min·cm$^2$, greater than or equal to about 60 ml/min·cm$^2$, greater than or equal to about 70 ml/min·cm$^2$, greater than or equal to about 80 ml/min·cm$^2$, greater than or equal to about 90 ml/min·cm$^2$, greater than or equal to about 100 ml/min·cm$^2$, greater than or equal to about 125 ml/min·cm$^2$, greater than or equal to about 150 ml/min·cm$^2$, or greater than or equal to about 175 ml/min·cm$^2$. In some embodiments, the fiber web may have an initial permeate flux of less than about 200 ml/min·cm$^2$, less than about 175 ml/min·cm$^2$, less than about 150 ml/min·cm$^2$, less than about 125 ml/min·cm$^2$, less than about 100 ml/min·cm$^2$, less than about 90 ml/min·cm$^2$, less than about 80 ml/min·cm$^2$, less than about 70 ml/min·cm$^2$, less than about 60 ml/min·cm$^2$, less than about 50 ml/min·cm², less than about 40 ml/min·cm², less than about 30 ml/min·cm², less than about 20 ml/min·cm², or less than about 10 ml/min·cm². Combinations of the above-referenced ranges are possible (e.g., an initial permeate flux of greater than about 5 ml/min·cm² and less than about 60 ml/min·cm²). Other ranges are also possible.

In some embodiments, a fiber web described herein may have a final permeate flux of between about 1.5 ml/min·cm² and about 150 ml/min·cm². For example, the final permeate flux may be greater than or equal to about 1.5 ml/min·cm², greater than or equal to about 2 ml/min·cm², greater than or equal to about 5 ml/min·cm², greater than or equal to about 10 ml/min·cm², greater than or equal to about 20 ml/min·cm², greater than or equal to about 30 ml/min·cm², greater than or equal to about 40 ml/min·cm², greater than or equal to about 50 ml/min·cm², greater than or equal to about 60 ml/min·cm², greater than or equal to about 70 ml/min·cm², greater than or equal to about 80 ml/min·cm², greater than or equal to about 90 ml/min·cm², greater than or equal to about 100 ml/min·cm², or greater than or equal to about 125 ml/min·cm². In some embodiments, the fiber web may have a final permeate flux of less than about 150 ml/min·cm², less than about 125 ml/min·cm², less than about 100 ml/min·cm², less than about 90 ml/min·cm², less than about 80 ml/min·cm², less than about 70 ml/min·cm², less than about 60 ml/min·cm², less than about 50 ml/min·cm², less than about 40 ml/min·cm², less than about 30 ml/min·cm², less than about 20 ml/min·cm², less than about 10 ml/min·cm², or less than about 5 ml/min·cm². Combinations of the above-referenced ranges are possible (e.g., a final permeate flux of greater than about 2 ml/min·cm² and less than about 30 ml/min·cm²). Other ranges are also possible.

In some embodiments, turbidity of a permeate that has passed through a fiber web can be measured. Turbidity refers to the haziness of a fluid caused by the presence of small particles dispersed in the solution. In general, a lower permeate turbidity reflects greater retentive capacity for the fiber web. As used herein, permeate turbidity is determined by passing an aqueous silica suspension, prepared as described above (i.e., 1,500 ppm silica), through a fiber web until 50 ml of permeate has been collected, and measuring turbidity of the collected permeate.

Turbidity can be measured with a nephelometer or a turbidimeter, which detects the amount of light scattered by the small particles when they are exposed to a light beam. Nephelometric Turbidity Unit (NTU) measurement is obtained by relating the light scattered by a liquid media to the light scattered by a known concentration of Formazin polymer. This unit of measure is recognized as a measure of the optical clarity of an aqueous sample. An example of a turbidimeter that can be used to measure turbidity is model Micro TPI/TPW, manufactured by HF Scientific, Inc. This meter is built to meet design criteria specified in ISO 7027 and DIN 27027 and satisfy criteria specified in Standard US EPA 180.1 on turbidity measurements.

In some embodiments, a permeate turbidity of a dirty water solution that has passed through a fiber web may be between about 0.1 NTU and about 12.0 NTU. In certain embodiments, the permeate turbidity of a fiber web may be less than or equal to about 12.0 NTU, less than or equal to about 10.0 NTU, less than or equal to about 8.0 NTU, less than or equal to about 6.0 NTU, less than or equal to about 5.0 NTU, less than or equal to about 4.5 NTU, less than or equal to about 4.0 NTU, less than or equal to about 3.5 NTU, less than or equal to about 3.0 NTU, less than or equal to about 2.5 NTU, less than or equal to about 2.0 NTU, less than or equal to about 1.5 NTU, less than or equal to about 1.0 NTU, less than or equal to about 0.8 NTU, less than or equal to about 0.6 NTU, less than or equal to about 0.4 NTU, less than or equal to about 0.2 NTU, or less than or equal to about 0.1 NTU. In some embodiments, the permeate turbidity may be greater than or equal to about 0.1 NTU, greater than or equal to about 0.5 NTU, greater than or equal to about 0.7 NTU, greater than or equal to about 1.0 NTU, greater than or equal to about 1.5 NTU, greater than or equal to about 2.0 NTU, greater than or equal to about 3.0 NTU, greater than or equal to about 5.0 NTU, greater than or equal to about 6.0 NTU, greater than or equal to about 8.0 NTU, or greater than or equal to about 10.0 NTU. Combinations of the above-referenced ranges are also possible (e.g., a permeate turbidity of less than or equal to about 2.5 NTU and greater than about 0.1 NTU). Other ranges are also possible.

In some embodiments, a fiber web or filter media described herein is associated with a particular absolute micron rating. As used herein, an absolute micron rating of a fiber web or filter media refers to the diameter of the largest spherical particle that will pass through the web or media. Beyond this cut-off point, the web or media will capture any larger particle. The absolute micron rating of a fiber web or filter media may be measured under laboratory conditions by determining the fiber web's filtration efficiency, as described herein. In some embodiments, a filter media described herein has an absolute micron rating of about 0.1 microns, about 0.15 microns, about 0.2 microns, about 0.25 microns, about 0.3 microns, about 0.35 microns, about 0.4 microns, about 0.45 microns, about 0.5 microns, about 0.55 microns, about 0.6 microns, about 0.65 microns, about 0.7 microns, about 0.75 microns, about 0.8 microns, about 0.85 microns, about 0.9 microns, about 0.95 microns, or about 1.0 microns. Fiber webs having an absolute micron rating between the above-noted values are also possible (e.g., an absolute micron rating of between about 0.3 microns and about 0.5 microns, between about 0.35 microns and about 0.6 microns). Other absolute micron ratings and ranges of absolute micron ratings are also possible.

It should be understood that the fiber webs described herein having the values and ranges of the features and performance characteristics described above may be formed using different combinations of the parameters described above to control fiber formation during an extrusion process. For example, in some embodiments, a method involving subjecting the polymeric material used to form the fibers to a dwell time of less than about 85 minutes, and using an extruder barrel having an inner diameter of about 4 inches or less, may lead to fibers having small diameters (e.g., average diameter of about 1.0 microns or less, about 0.8 microns or less, or about 0.6 microns or less), fiber webs having relatively high surface areas (e.g., about 1.8 m²/g or greater, about 2.0 m²/g or greater, or about 2.2 m²/g or greater), and/or to fiber webs having relatively low amounts of polymer degradation (e.g., a surface density of polymeric particles of less than about 5.0 particles/in², less than about 3.0 particles/in², less than about 2.0 particles/in², less than about 1.6 particles/in², less than about 1.0 particles/in², or less than about 0.8 particles/in², less than about 0.5 particles/in², or less than about 0.3 particles/in², wherein each of the particles has a largest cross-sectional dimension of 1.0 mm or greater). In other embodiments, a method of forming fibers involving subjecting the polymeric material used to form the fibers to a processing space having a volume less than about 25,000 cm³, less than about 15,000 cm³, or less than about 9,000 cm³ may lead to fibers and/or fiber webs having these characteristics.

In certain embodiments, a fiber web described herein may be combined with one or more other components such as a substrate and/or a scrim, optionally with an adhesive. Examples of substrates, scrims and adhesives are described in U.S. Publication No. 2009/0120048, filed Nov. 7, 2008, and entitled "Meltblown Filter Medium", which is incorporated herein by reference in its entirety for all purposes. In some cases, a fiber web or a composite including a fiber web can be charged.

In general, any of a variety of techniques can be used to charge the fiber web and or a composite including the fiber web to form an electret web. Examples include AC and/or DC corona discharge. In some embodiments, the composite is subjected to a discharge of at least 1 kV/cm (e.g., at least 5 kV/cm, at least 10 kV/cm), and/or at most 30 kV/cm (e.g., at most 25 kV/cm, at most 20 kV/cm). For example, in certain embodiments, the composite can be subjected to a discharge of from 1 kV/cm to 30 kV/cm (e.g., from 5 kV/cm to 25 kV/cm, from 10 kV/cm to 20 kV/cm). Exemplary processes are disclosed, for example, in U.S. Pat. No. 5,401,446, which, to the extent it is not inconsistent with the present disclosure, is incorporated herein by reference.

In some embodiments, a fiber web described herein can be a part of a filter element. Examples of filter elements include gas turbine filter elements, heavy duty air filter elements, automotive air filter elements, HVAC air filter elements, HEPA filter elements, vacuum bag filter elements, fuel filter elements, and oil filter elements. Such filter elements can be incorporated into corresponding filter systems (gas turbine filter systems, heavy duty air filter systems, automotive air filter systems, HVAC air filter systems, HEPA filter systems, vacuum bag filter systems, fuel filter systems, and oil filter systems). Vacuum filter bag systems are commonly used in home vacuum cleaners. In such embodiments, a filter medium can optionally be prepared by coating a paper with the meltblown material. In certain embodiments, a filter medium can be prepared using a wet laid or dry laid product (e.g., cellulose, polymer, glass). A filter medium can optionally be pleated into any of a variety of configurations (e.g., panel, cylindrical). Examples of filter media are described in more detail in U.S. Publication No. 2009/0120048, filed Nov. 7, 2008, and entitled "Meltblown Filter Medium", which is incorporated herein by reference in its entirety for all purposes.

The following examples are exemplary and not intended as limiting.

Examples 1-10

Examples 1-10 show that various process parameters of an extrusion process can be varied to form fiber webs having small fiber diameters, high surface area, low air permeabilities, and/or low levels of polymer degradation according to certain embodiments described herein.

A total of 80 experiments were conducted in which different fiber webs were formed with either polypropylene or polyester (polybutyleneterephthalate) fibers using a process similar to the one shown in FIG. 1, while varying various process conditions including extruder barrel inner diameter, die body temperature, and polymer throughput. Performance characteristics and physical properties of the resulting fiber webs including air permeability, level of polymer degradation (e.g., surface density of particles), surface area, and fiber size were measured, and the values were compiled and input into modeling software, where mathematical modeling of these properties was performed. The models were refined (through reduction) until an acceptable accountability of the combined effect was obtained. A response calculation for each of the performance characteristics and physicals properties was determined.

The resulting, non-coded, mathematical models were then placed into an Excel spreadsheet, where a simple mathematical equation function was utilized to render the predicted physical property values of fiber webs that may be produced using different processing conditions (e.g., varying the values for extruder barrel inner diameter, die body temperature and polymer throughput). The results of the calculations are shown in Tables 1-3.

For each of the Examples shown in Tables 1-3, the following processing conditions would be used: extruder temperature profile (ramping) of 300° F., 325° F., 350° F., 375° F., 400° F., 425° F., 450° F.; the process air temperature being the same as that of the die body temperature; a process air setting of 3150 lbs/hr; a die to collector distance of 8.0 inches; a quench air rate of 225 lbs/hr; and a vacuum level of 17,500 ft$^3$.

TABLE 1

|  | Comparative Example 1 | Example 1 | Example 2 | Example 3 |
|---|---|---|---|---|
| Extruder Barrel Inner Diameter (inches) | 5 | 2 | 1 | 1 |
| Extruder Barrel Length (inches) | 150 | 60 | 30 | 30 |
| Conduit Diameter (inches) | 1.5 | 1 | 0.75 | 0.75 |
| Conduit Length (inches) | 144 | 144 | 144 | 144 |
| Polymer Type | Polypropylene (PP) | PP | PP | PP |
| Polymer Throughput (lb/hr) | 30 | 58 | 61 | 102 |
| Die Body Temp (° F.) | 470 | 510 | 510 | 530 |
| Dwell Time (min) | 157 | 13 | 9 | 5 |
| Volume of processing space (cm$^3$) | 25459 | 6300 | 4541 | 4541 |
| Air Permeability (ft$^3$/min/ft$^2$) | 409 | 409 | 409 | 409 |
| Surface Area (m$^2$/g) | 1.14 | 1 | 0.95 | — |
| Surface density of particles* (particles/in$^2$) | 3.29 | 0 | 0 | 0.25 |
| Fiber Diameter (microns) | 0.95 | 1.2 | 1.28 | 1.44 |

*The particles refer to ones having a largest cross-sectional dimension of 1.0 mm or greater.

Examples 1-3 show that by reducing the extruder barrel inner diameter, extruder barrel length and conduit diameter, and increasing the polymer throughput, the dwell times of the polymer in the processing space can be reduced. The surface density of particles of degraded polymer in fiber webs produced by processes under such conditions would be reduced compared to that of Comparative Example 1, where the dwell time is relatively higher. Examples 1-3 also show that by decreasing the volume of the processing space (e.g., by reducing the extruder barrel length and conduit diameter), relatively high throughputs can be used and can be used to form fiber media having similar performance characteristics (e.g., air permeability) as media formed by the processing conditions shown for Comparative Example 1 (e.g., lower throughputs but higher processing space volumes). Higher throughputs may result in lower manufacturing costs.

TABLE 2

|  | Comparative Example 2 | Example 4 | Example 5 | Example 6 | Example 7 |
|---|---|---|---|---|---|
| Extruder Barrel Inner Diameter (inches) | 5 | 2 | 2 | 1 | 1 |
| Extruder Barrel Length (inches) | 150 | 60 | 60 | 30 | 30 |
| Conduit Diameter (inches) | 1.5 | 1 | 1 | 0.75 | 0.75 |
| Conduit Length (inches) | 144 | 144 | 144 | 144 | 144 |
| Polymer Type | Polypropylene (PP) | PP | PP | PP | PP |
| Polymer Throughput (lb/hr) | 30 | 30 | 30 | 30 | 30 |
| Die Body Temp (° F.) | 470 | 470 | 510 | 510 | 530 |
| Dwell Time (min) | 100 | 24 | 24 | 17 | 17 |
| Volume of processing space ($cm^3$) | 25459 | 6300 | 6300 | 4541 | 4541 |
| Air Permeability ($ft^3/min/ft^2$) | 409 | 403 | 261 | 229 | 143 |
| Surface Area ($m^2/g$) | 1.14 | 1.23 | 1.48 | 1.56 | 1.7 |
| Surface density of particles* (particles/$in^2$) | 3.29 | 0.75 | 0.75 | 0 | 0 |
| Fiber Diameter (microns) | 0.95 | 1.13 | 0.96 | 0.96 | 0.84 |

*The particles refer to ones having a largest cross-sectional dimension of 1.0 mm or greater.

Examples 4-7 show that by reducing the extruder barrel inner diameter, extruder barrel length and conduit diameter, the dwell time of the polymer in the processing space can be reduced. The surface density of particles of degraded polymer in fiber webs produced by processes under such conditions would be reduced compared to that of Comparative Example 2, where the dwell time is relatively higher. The processing conditions shown in Examples 4-7 can also result in fiber webs having lower air permeabilities and higher surface areas. Smaller fiber diameters (Example 7) can also be produced.

TABLE 3

|  | Comparative Example 2 | Example 8 | Example 9 | Example 10 |
|---|---|---|---|---|
| Extruder Barrel Inner Diameter (inches) | 5 | 1.5 | 1.5 | 1.5 |
| Extruder Barrel Length (inches) | 150 | 45 | 45 | 45 |
| Conduit Diameter (inches) | 1.5 | 0.75 | 0.75 | 0.75 |
| Conduit Length (inches) | 144 | 144 | 144 | 144 |
| Polymer Type | Polypropylene (PP) | PP | PP | PP |
| Polymer Throughput (lb/hr) | 30 | 30 | 15 | 15 |
| Die Body Temp (° F.) | 470 | 600 | 550 | 560 |
| Dwell Time (min) | 100 | 18 | 36 | 36 |
| Volume of processing space ($cm^3$) | 25459 | 4862 | 4862 | 4862 |
| Air Permeability ($ft^3/min/ft^2$) | 409 | ~89 | 69 | 46 |
| Surface Area ($m^2/g$) | 1.14 | 2.13 | 2.07 | 2.14 |
| Surface density of particles* (particles/$in^2$) | 3.28 | 0.30 | 0.53 | 0.53 |
| Fiber Diameter (microns) | 0.96 | 0.50 | 0.67 | 0.60 |

*The particles refer to ones having a largest cross-sectional dimension of 1.0 mm or greater.

Examples 8-10 show that by reducing the extruder barrel inner diameter, extruder barrel length and conduit diameter, the dwell time of the polymer in the processing space can be reduced. The surface density of particles of degraded polymer in fiber webs produced by processes under such conditions would be reduced compared to that of Comparative Example 2, where the dwell time is relatively higher. The processing conditions shown in Examples 8-10 can also result in fiber webs having lower air permeabilities, higher surface areas, and smaller fiber diameters.

Examples 11-13

Examples 11-12 show that fiber webs having small fiber diameters can be formed using extrusion processes described herein, and that multiple fiber webs formed by such a process can be stacked to form a single, thicker fiber web.

In Example 11, a polypropylene resin was processed using a 1.5 inch diameter extruder and a meltblown web (i.e., a base layer) was formed having a mean fiber size of 500 nm (S1). Eight hand sheets of the base layer were stacked on top of one another and compressed with a flatbed laminator at 90 psi, 275 deg F., for a residence time of 24 seconds (S2). Ten hand sheets of the base layer were also stacked on top of one another and compressed with a flatbed laminator at 90 psi, 275 deg F., for a residence time of 24 seconds (S3). The properties of these webs are summarized in Table 4.

TABLE 4

Example 11

| | Basis weight ($g/m^2$) | Air permeability (CFM) | Thickness (microns) | Mean Flow Pore (microns) | Bubble point (microns) | Solidity (%) |
|---|---|---|---|---|---|---|
| Meltblown "base" layer - S1 | 17 | 389** (10*) | 150 | 5.3 | 10.3 | 5 |
| 8 base layers compressed altogether - S2 | 136 | 3.6** | 295 | 0.5 | 1.75 | — |
| 10 base layers compressed altogether - S3 | 170 | 2.9** | 360 | 0.4 | 1.6 | — |

*measurement at a pressure of 250 mm of water -
**measurement at 12.5 mm of water In Example 12, a polypropylene resin was processed with a 1.5 inch diameter extruder and a meltblown web (i.e., a base layer) was formed having a mean fiber size of 500 nm. In sample S4, four hand sheets of the base layer were stacked a top each other and compressed between calender rolls under a linear pressure of 90 lb/inch at 140 deg F. and line speed of 30 fpm. Properties of these webs are summarized in Table 5.

TABLE 5

Example 12

| | Basis weight ($g/m^2$) | Air permeability (CFM) | Thickness (microns) | Mean Flow Pore (microns) | Bubble point (microns) | Solidity (%) |
|---|---|---|---|---|---|---|
| 4 base layers calendared altogether - S4 | 68 | 2.25* | 115 | 0.35 | 1.25 | 58 |

*Air permeability measured at 12.5 mm of water

Liquid filtration performance characteristics for the fiber webs described in Tables 4 and 5 were measured.

All liquid filtration measurements were performed using fiber webs having that were cut into circular pieces having a diameter of 47 mm. The cut fiber webs were placed into a holder having an O-ring that reduced the effective area of the fiber web to 12.5 $cm^2$. The fiber web was first wetted by soaking the web for 1 minute in a mixture isopropanol/water 70/30 v/v. The web was then soaked in deionized water for 1 minute to exchange the isopropanol with water. The fiber web was then rinsed in deionized water for 1 minute. The fiber web was then placed into a filtration cell (an in-line stainless steel filter holder with a diameter of 47 mm) while the fiber web was still fully wetted with water.

Water flux was measured by passing deionized water through a fiber web at a pressure of 20 psi until 500 ml of permeate was collected. Water flux was calculated by dividing the flow rate (ml/min) by the effective area of the fiber web (12.5 $cm^2$). Table 6 shows the water flux and water permeability measured for the fiber webs described in Tables 4 and 5.

TABLE 6

| Sample ID | Water flux (ml/min · $cm^2$) | Water permeability (ml/min · $cm^2$ · psi) |
|---|---|---|
| S2 (compressed-8L) MFP –0.5 micron | 40 | 2 |
| S3 (compressed-10L) MFP –0.4 micron | 20 | 1 |

TABLE 6-continued

| Sample ID | Water flux (ml/min · cm$^2$) | Water permeability (ml/min · cm$^2$ · psi) |
|---|---|---|
| S4 (calendered) MFP –0.35 micron | 15 | 0.75 |

Table 7 shows initial permeate flux, final permeate flux, flux decline, and permeate turbidity that was measured after passing an aqueous silica dispersion (having an turbidity of 1,040 NTU prior to filtration) through the fiber webs described in Tables 4 and 5. The aqueous silica dispersion, prepared by dispersing ISO 12103-1-A2 silica fine test dust (manufactured by Powder Technology) in deionized water at a concentration of 1,500 ppm, was passed through each of the fiber webs at a pressure of 30 psi until 50 ml of permeate was collected (initial permeate flux) or until 500 ml of permeate was collected (final permeate flux). The collected permeate was used for the turbidity measurements using a turbidimeter (model Micro TPI/TPW, manufactured by HF Scientific, Inc., which is built to meet design criteria specified in ISO 7027 and DIN 27027) as per US EPA 180.1 Standard specifications.

TABLE 7

| Sample ID | Initial permeate flux at 50 ml permeate* (ml/min · cm$^2$) | Final permeate flux at 500 ml permeate* (ml/min · cm$^2$) | Flux decline (%)* | Permeate turbidity (NTU) |
|---|---|---|---|---|
| S2 (compressed-8L) MFP –0.5 microns | 12 | 5 | 58 | 0.5 |
| S3 (compressed-10L) MFP –0.4 microns | 20 | 6.5 | 67.5 | 1.9 |
| S4 (calendered) MFP –0.35 microns | 11.5 | 4.5 | 61 | 0.45 |

*All flux measurements were conducted at 30 psi

As shown in Tables 6 and 7, each of samples S2, S3 and S4 had a relatively high water permeability, meaning the fiber webs had relatively low resistances across the webs. Each of the samples also had relatively low permeate turbidity measurements when filtering a 1,500 ppm aqueous silica dispersion, indicating that the fiber webs have a relatively large retentive properties. Furthermore, when filtering a 1,500 ppm aqueous silica dispersion, each of the fiber webs had relatively low final permeate flux measurements, indicating that the fiber webs had a relatively low tendency to clog.

Example 13

Surface area measurements of several fiber web samples were performed. Sample S5 included two S1 samples (as described in Example 11) that were compressed together using a flatbed laminator at a temperature of 275° F., a pressure of 60 psi, and a residence time of 24 seconds. Sample S6 included three S1 samples that were compressed together using a flatbed under the same conditions.

Sample NB1 included fibers having an average fiber diameter of 1 micron. Sample NB2 included two NB1 samples that were compressed together. Sample NB3 included three NB1 samples that were compressed together.

Sample MB1 included fibers having an average fiber diameter of 2.5 microns. Sample MB2 included two MB1 samples that were compressed together. Sample MB3 included three MB1 samples that were compressed together.

The results are shown in Table 8.

TABLE 8

| Sample ID | Surface area (m$^2$/g) | Compression setting |
|---|---|---|
| S1- fiber size: 0.5 microns | 3.0 | Uncompressed |
| S5 (2xS1 compressed) | 2.7 | Flatbed laminator: 275° F. - 60 psi - 24 sec |
| S6 (3xS1 compressed) | 2.7 | Flatbed laminator: 275° F. - 60 psi - 24 sec |
| NB1-fiber size: 1 micron | 1.7 | Uncompressed |
| NB2 (2xNB1 compressed) | 1.6 | Flatbed laminator: 275° F. - 60 psi - 24 sec |
| NB3 (3xNB1 compressed) | 1.55 | Flatbed laminator: 275° F. - 60 psi - 24 sec |
| MB1- fiber size 2.5 microns | 1.0 | Uncompressed |

TABLE 8-continued

| Sample ID | Surface area (m²/g) | Compression setting |
|---|---|---|
| MB2 (2xMB 1 compressed) | 0.95 | Flatbed laminator: 275° F. - 60 psi - 24 sec |
| MB3 (3xMB 1 compressed) | 0.9 | Flatbed laminator: 275° F. - 60 psi - 24 sec |

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A filter media comprising:
a fiber web comprising a plurality of meltblown fibers having an average fiber diameter between about 0.1 microns and about 1.5 microns, wherein the fiber web has:
a mean pore size of greater than about 0.1 microns and less than about 5.0 microns;
a surface area of greater than or equal to about 1.5 m²/g;
a water permeability of greater than about 0.2 ml/min·cm²·psi, wherein determining the water permeability comprises passing deionized water through the fiber web at a pressure of 20 psi until 1,000 ml of permeate has been collected;
a permeate turbidity of less than about 8 NTU, wherein determining the permeate turbidity comprises passing a dispersion of ISO 12103-1-A2 silica fine test dust in deionized water at a concentration of 1,500 ppm through the fiber web at a pressure of 30 psi until 50 ml of permeate is collected, and measuring turbidity of the collected permeate;
a basis weight between about 1 g/m² and about 200 g/m²; and
a thickness between about 0.002 inches and about 0.02 inches,
wherein the fiber web has a bubble point between about 0.1 microns and about 30 microns, wherein the bubble point is measured according to the standard ASTM F-316-80 Method B, BS6410.

2. The filter media of claim 1, wherein the fiber web has a consistency of basis weight across the fiber web of about 3.0 standard deviations or less.

3. The filter media of claim 1, wherein the fiber web has a consistency of thickness across the fiber web of about 3.0 standard deviations or less.

4. The filter media of claim 1, wherein the average fiber diameter of the plurality of meltblown fibers is less than about 1.0 microns.

5. The filter media of claim 1, wherein the average fiber diameter of the plurality of meltblown fibers is less than about 0.6 microns.

6. The filter media of claim 1, comprising a solidity of greater than or equal to about 10% and less than about 70%.

7. The filter media of claim 1, comprising a solidity of greater than or equal to about 25% and less than about 55%.

8. The filter media of claim 1, wherein the fiber web comprises a first layer and a second layer, wherein each of the first layer and second layers comprises the plurality of meltblown fibers having an average fiber diameter between about 0.1 microns and about 1.5 microns, and wherein the second layer has the same composition as the first layer.

9. The filter media of claim 1, wherein the fiber web has an air permeability of greater than about 2 CFM and less than about 35 CFM.

10. The filter media of claim 1, wherein the water permeability of the fiber web is greater than about 0.2 ml/min·cm²·psi and less than about 4 ml/min·cm²·psi.

11. The filter media of claim 1, wherein the fiber web has an initial permeate flux greater than about 5 ml/min·cm² and less than about 200 ml/min·cm².

12. The filter media of claim 1, wherein the fiber web has an initial permeate flux greater than about 5 ml/min·cm² and less than about 60 ml/min·cm².

13. The filter media of claim 1, wherein the fiber web has a final permeate flux greater than about 1.5 ml/min·cm² and less than about 100 ml/min·cm².

14. The filter media of claim 1, wherein the fiber web has a final permeate flux greater than about 2 ml/min·cm² and less than about 30 ml/min·cm².

15. The filter media of claim 1, wherein the permeate turbidity of the fiber web is less than about 5 NTU.

16. The filter media of claim 1, wherein the permeate turbidity of the fiber web is less than about 2.5 NTU.

17. The filter media of claim 1, wherein the surface area of the fiber web is greater than about 2.0 m²/g and less than or equal to about 6 m²/g.

18. A filter element comprising the filter media of claim 1.

19. A method comprising passing a liquid through the filter media of claim 1.

* * * * *